(12) United States Patent
Chai et al.

(10) Patent No.: US 10,687,310 B2
(45) Date of Patent: Jun. 16, 2020

(54) METHOD FOR CONTROLLING COMMUNICATION, USER EQUIPMENT, AND BASE STATION

(71) Applicant: HUAWEI TECHNOLOGIES CO., LTD., Shenzhen (CN)

(72) Inventors: Li Chai, Beijing (CN); Hong Wang, Beijing (CN); Zhenzhen Cao, Beijing (CN); Liangliang Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/935,034

(22) Filed: Mar. 25, 2018

(65) Prior Publication Data
US 2018/0213508 A1 Jul. 26, 2018

Related U.S. Application Data

(63) Continuation of application No. PCT/CN2015/090807, filed on Sep. 25, 2015.

(51) Int. Cl.
*H04W 4/00* (2018.01)
*H04W 72/00* (2009.01)
(Continued)

(52) U.S. Cl.
CPC ......... *H04W 72/005* (2013.01); *H04L 5/0048* (2013.01); *H04W 72/04* (2013.01);
(Continued)

(58) Field of Classification Search
USPC ............... 370/329, 241, 252, 254, 312, 350
See application file for complete search history.

(56) References Cited

U.S. PATENT DOCUMENTS

2010/0261469 A1 10/2010 Ribeiro et al.
2011/0268006 A1 11/2011 Koskela et al.
(Continued)

FOREIGN PATENT DOCUMENTS

CN 102893685 A 1/2013
CN 104202821 A 12/2014
(Continued)

OTHER PUBLICATIONS

"3GPP TS 36.331 V12.7.0 3rd Generation Partnership Project;Technical Specification Group Radio Access Network; Evolved Universal Terrestrial Radio Access (E-UTRA);Radio Resource Control (RRC);Protocol specification(Release 12),Technical Specification, Sep. 2015, 452 pages".

(Continued)

*Primary Examiner* — Phuongchau Ba Nguyen
(74) *Attorney, Agent, or Firm* — Kilpatrick Townsend & Stockton LLP

(57) ABSTRACT

The present invention provides a method for controlling communication, user equipment, and a base station. The method includes: obtaining, by user equipment from a base station when needing to perform first communication, a first communication resource required for the first communication, where the obtaining, by user equipment from a base station, a first communication resource required for the first communication includes: obtaining, if the user equipment is in an RRC idle state, the first communication resource by receiving a SIB broadcast by the base station; or entering an RRC connected state if the user equipment is in an RRC idle state, and sending a first communication resource request to the base station; or sending a first communication resource request to the base station if the user equipment is in an RRC connected state.

13 Claims, 12 Drawing Sheets

(51) Int. Cl.
- H04W 72/04 (2009.01)
- H04W 76/27 (2018.01)
- H04L 5/00 (2006.01)
- H04W 88/04 (2009.01)
- H04W 88/08 (2009.01)

(52) U.S. Cl.
CPC ............ H04W 76/27 (2018.02); *H04W 88/04* (2013.01); *H04W 88/08* (2013.01)

(56) References Cited

U.S. PATENT DOCUMENTS

| | | | |
|---|---|---|---|
| 2012/0021689 A1 | 1/2012 | Han | |
| 2014/0301228 A1 | 10/2014 | Kwak et al. | |
| 2015/0264677 A1* | 9/2015 | He | H04W 72/02 370/312 |
| 2017/0006582 A1 | 1/2017 | Jung et al. | |
| 2017/0230938 A1* | 8/2017 | Huang | H04W 76/10 |
| 2017/0303240 A1* | 10/2017 | Basu Mallick | H04W 76/14 |
| 2018/0167904 A1* | 6/2018 | Lee | H04W 56/002 |
| 2019/0191452 A1 | 6/2019 | Pelletier et al. | |

FOREIGN PATENT DOCUMENTS

| | | |
|---|---|---|
| CN | 104335654 A | 2/2015 |
| CN | 104349355 A | 2/2015 |
| WO | 2014168412 A1 | 10/2014 |
| WO | 2015054256 A1 | 4/2015 |
| WO | 2015115847 A1 | 6/2015 |
| WO | 2015112256 A1 | 7/2015 |

OTHER PUBLICATIONS

"3GPP TS 36.300 V13.1.0 3rd Generation Partnership Project-;Technical Specification Group Radio Access Network; Evolved Universal Terrestrial Radio Access (E-UTRA) and Evolved Universal Terrestrial Radio Access Network (E-UTRAN);Overall description; Stage 2(Release 13),Technical Specification, Sep. 2015, 254 pages".

"3GPP TS 23.303 V13.1.0 3rd Generation Partnership Project;Technical Specification Group Services and System Aspects;Proximity-based services(ProSe); Stage 2(Release 13),Technical Specificaiton, Sep. 2015, 115 pages".

XP051023160 3GPP TS 36.300 V12.7.0 (Sep. 2015),3rd Generation Partnership Project;Technical Specification Group Radio Access Network;Evolved Universal Terrestrial Radio Access (E-UTRA)and Evolved Universal Terrestrial Radio Access Network(E-UTRAN);Overall description;Stace 2(Release 12),total 254 pages.

R1-154646 NTT DOCOMO,"Remaining Issues on Resource Allocation for UE-to-Network Relay",3GPP TSG RAN WG1 Meeting #82,Beijing, China, Aug. 24-28, 2015,total 5 pages.

R1-154050 ZTE,"Resource scheme for UE-to-network Relay UE and remote UE",3GPP TSG-RAN WG1 Meeting #82, Beijing, China, Aug. 24-28, 2015,total 6 pages.

Nokia Corporation, Nokia Networks, Timing and resource pools of Type 2B discovery signals, 3GPP TSG-RAN WG1#78 R1-143248, Aug. 10, 2014. 3 pages.

* cited by examiner

METHOD FOR CONTROLLING COMMUNICATION, USER EQUIPMENT, AND BASE STATION

CROSS-REFERENCE TO RELATED APPLICATIONS

This application is a continuation of International Application No. PCT/CN2015/090807, filed on Sep. 25, 2015, The disclosures of the aforementioned applications are hereby incorporated by reference in their entireties.

TECHNICAL FIELD

Embodiments of the present invention relate to communications technologies, and in particular, to a method for controlling communication, user equipment, and a base station.

BACKGROUND

Usually, communication between user equipments is implemented by means of forwarding by a base station in a cellular communications technology. That is, user equipment communicates with a base station by using an air interface, and the base station forwards user data to a destination node in a network. However, in cellular communications, due to a shortage of radio spectrum resources, how to improve utilization of a spectrum resource has become a research hotspot.

In view of this, a new wireless interface technology, device-to-device (D2D) communication, has been proposed. D2D communication is a new communications technology in which user equipments are allowed to directly communicate with each other by reusing a cell resource. This can increase spectrum efficiency of a cellular communications system, reduce load of a base station, and resolve, to some extent, a problem of a shortage of spectrum resources in a wireless communications system.

Currently, D2D communication supports multicast communication (that is, 1-to-many communication). That is, D2D user equipment (UE) may send D2D data to several UEs in a communication group. Currently, for D2D communication, a main research hotspot is multicast communication. However, in an actual application, there may be a unicast communication (that is, 1-to-1 communication) requirement. That is, one UE communicates with another UE in a D2D communication manner. Under this requirement, how a base station controls user equipments needing to perform unicast D2D communication has become a problem that urgently needs to be resolved.

SUMMARY

Embodiments of the present invention provide a method for controlling communication, user equipment, and a base station, so that the base station controls first communication of the user equipment.

A first aspect of the present invention provides a method for controlling communication, where user equipment obtains, from a base station when needing to perform first communication, a first communication resource required for the first communication, where that user equipment obtains, from a base station, a first communication resource required for the first communication includes:

obtaining, if the user equipment is in an RRC idle state, the first communication resource by receiving a system information block SIB broadcast by the base station; or entering an RRC connected state if the user equipment is in an RRC idle state, and sending a first communication resource request to the base station, where the first communication resource request is used to request the base station to allocate the first communication resource; or sending a first communication resource request to the base station if the user equipment is in an RRC connected state, where the first communication resource request is used to request the base station to allocate the first communication resource.

With reference to the first aspect, in a first possible implementation of the first aspect, that user equipment obtains, from a base station when needing to perform first communication, a first communication resource required for the first communication includes:

obtaining, by the user equipment, the first communication resource according to a use mode of the first communication resource, where the use mode of the first communication resource includes a shared mode and an independent mode, where the shared mode means that the first communication resource and a second communication resource can be shared; or the independent mode means that the first communication resource and the second communication resource are used independently;

the use mode of the first communication resource is stipulated in a protocol, or configured by using an RRC message; and the second communication resource is a corresponding communication resource used when second communication is performed.

With reference to the first aspect or the first possible implementation of the first aspect, in a second possible implementation of the first aspect, the obtaining, if the user equipment is in an RRC idle state, the first communication resource by receiving a system information block SIB broadcast by the base station includes:

if the use mode of the first communication resource is the shared mode, and the SIB broadcast by the base station includes a second communication resource pool used for the second communication and includes an indication message instructing the user equipment to perform the first communication by using the second communication resource pool, remaining, by the user equipment, in the idle state, and obtaining the first communication resource used for the first communication from the second communication resource pool that is used for the second communication and that is included in the SIB broadcast by the base station; or if the use mode of the first communication resource is the independent mode, and the SIB broadcast by the base station includes a first communication resource pool used for the first communication, remaining, by the user equipment, in the idle state, and obtaining the first communication resource used for the first communication from the first communication resource pool that is used for the first communication and that is included in the SIB broadcast by the base station.

With reference to the first aspect or the first possible implementation of the first aspect, in a third possible implementation of the first aspect, the entering an RRC connected state if the user equipment is in an RRC idle state, and sending a first communication resource request to the base station includes:

if the use mode of the first communication resource is the shared mode, and the SIB broadcast by the base station does not provide a second communication resource pool used for the second communication or a first communication resource pool used for the first communication, entering, by the user equipment, the RRC connected state, and sending the first communication resource request to the base station; or if the use mode of the first communication resource is the independent mode, and the SIB broadcast by the base station does not provide a first communication resource pool used for the first communication, entering, by the user equipment, the RRC connected state, and sending the first communication resource request to the base station; or if the use mode of the first communication resource is the independent mode, and the SIB broadcast by the base station includes a second communication resource pool used for the second communication and does not include an indication message instructing the user equipment to perform the first communication by using the second communication resource pool or includes an indication message used to indicate that the user equipment cannot perform the first communication by using the second communication resource pool, entering, by the user equipment, the RRC connected state, and sending the first communication resource request to the base station; or if the SIB broadcast by the base station includes an indication message instructing the user equipment to enter the RRC connected state and send the first communication resource request to the base station to obtain the first communication resource, entering, by the user equipment, the RRC connected state, and sending the first communication resource request to the base station.

With reference to any one of the first aspect to the third possible implementation of the first aspect, in a fourth possible implementation of the first aspect, after the sending, by the user equipment, the first communication resource request to the base station, the method further includes:

receiving, by the user equipment, an indication message indicating that the base station instructs, by using first RRC signaling or a first Media Access Control control element MAC CE, the user equipment to perform the first communication by using the second communication resource pool used for the second communication; and selecting, by the user equipment, the first communication resource from the second communication resource pool; or receiving, by the user equipment, an indication message indicating that the base station instructs, by using second RRC signaling or a second MAC CE, the user equipment to reuse a sidelink-radio network temporary identifier SL-RNTI to obtain the first communication resource, where the SL-RNTI is an RNTI used to schedule the second communication resource used for the second communication; and obtaining, by the user equipment according to the SL-RNTI, the second communication resource allocated by the base station, and using the second communication resource as the first communication resource.

With reference to any one of the first aspect to the third possible implementation of the first aspect, in a fifth possible implementation of the first aspect, after the sending, by the user equipment, the first communication resource request to the base station, the method further includes:

receiving, by the user equipment, a resource rejection message that is sent by the base station to the user equipment by using third RRC signaling or a third Media Access Control control element MAC CE, where the resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication; or if the user equipment receives no information about resource allocation of the base station, determining that the first communication cannot be performed.

With reference to any one of the first aspect to the fifth possible implementation of the first aspect, in a sixth possible implementation of the first aspect, after the sending, by the user equipment, the first communication resource request to the base station, the method further includes:

receiving, by the user equipment, the first communication resource pool that is sent by the base station by using fourth RRC signaling or a fourth MAC CE; and selecting, by the user equipment, the first communication resource from the first communication resource pool; or receiving, by the user equipment, a new radio network temporary identifier New-RNTI that is sent by the base station by using fifth RRC signaling or a fifth MAC CE, where the New-RNTI is an RNTI used to schedule the communication resource used for the first communication; and obtaining, by the user equipment, the first communication resource according to the New-RNTI.

With reference to any one of the first aspect to the sixth possible implementation of the first aspect, in a seventh possible implementation of the first aspect, the first communication is unicast D2D communication or relay communication, and the second communication is multicast D2D communication.

With reference to any one of the first aspect to the seventh possible implementation of the first aspect, in an eighth possible implementation of the first aspect, the user equipment is remote user equipment or relay user equipment.

A second aspect of the present invention provides a method for controlling communication, where the communication is first communication, and the method includes:

receiving, by user equipment, information that is sent by a base station by using RRC signaling or a MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool; and according to the information, stopping, by the user equipment, the first communication or stopping using the resource used for the first communication and/or stopping using the configured New-RNTI used to schedule the communication resource used for the first communication and/or stopping using the configured SL-RNTI used to schedule the communication resource used for the second communication; or receiving, by the user equipment, a grant message that is sent by the base station by using a PDCCH or an ePDCCH and that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication; and obtaining, by the user equipment according to the corresponding SL-RNTI or New-RNTI, the indication message instructing to stop the first communication, and stopping performing the first communication.

With reference to the second aspect, in a first possible implementation of the second aspect, the MAC CE includes a MAC PDU subheader of a particular logical channel index identifier; or the MAC CE includes an identifier of the user equipment whose first communication is stopped and/or indication information instructing the user equipment to stop the first communication.

With reference to the second aspect or the first possible implementation of the second aspect, in a second possible implementation of the second aspect, the first communication is unicast D2D communication or relay communication, and the second communication is multicast D2D communication.

With reference to any one of the second aspect to the second possible implementation of the second aspect, in a third possible implementation of the second aspect, the user equipment is remote user equipment or relay user equipment.

With reference to any one of the second aspect to the third possible implementation of the second aspect, in a fourth possible implementation of the second aspect, the method further includes:

reporting, by the user equipment, a measurement event to the base station, where the measurement event indicates that link quality and/or signal strength of receiving by the user equipment from the base station satisfy/satisfies a specific condition; and/or reporting, by the user equipment, a measurement result to the base station, where the measurement result includes RSRP and/or RSRQ.

A third aspect of the present invention provides a method for controlling communication, where a base station allocates, to user equipment needing to perform first communication, a first communication resource required for the first communication, including:

broadcasting, by the base station, a SIB message carrying the first communication resource, so that the user equipment in an RRC idle state obtains the first communication resource according to the SIB message; or receiving, by the base station, a first communication resource request sent by the user equipment in an RRC connected state; and allocating, by the base station, the first communication resource to the user equipment in the RRC connected state according to the first communication resource request.

With reference to the third aspect, in a first possible implementation of the third aspect, that a base station allocates, to user equipment needing to perform first communication, a first communication resource required for the first communication includes:

allocating, by the base station, the first communication resource required for the first communication to the user equipment according to a use mode of the first communication resource, where the use mode of the first communication resource includes a shared mode and an independent mode, where the shared mode means that the first communication resource and a second communication resource can be shared; or the independent mode means that the first communication resource and the second communication resource are used independently;

the use mode of the first communication resource is stipulated in a protocol, or configured by using an RRC message; and the second communication resource is a corresponding communication resource used when second communication is performed.

With reference to the third aspect or the first possible implementation of the third aspect, in a second possible implementation of the third aspect, the broadcasting, by the base station, a SIB carrying the first communication resource, so that the user equipment in an RRC idle state obtains the first communication resource according to the SIB includes:

if the use mode of the first communication resource is the shared mode, broadcasting, by the base station, a first SIB, where the first SIB includes a second communication resource pool used for the second communication and includes an indication message instructing the user equipment to perform the first communication by using the second communication resource pool, and the first SIB enables the user equipment in the RRC idle state to remain in the idle state, and select the first communication resource from the second communication resource pool; or if the use mode of the first communication resource is the independent mode, broadcasting, by the base station, a second SIB, where the second SIB includes a first communication resource pool used for the first communication, and the second SIB enables the user equipment in the RRC idle state to select the first communication resource from the first communication resource pool.

With reference to the third aspect or the first possible implementation of the third aspect, in a third possible implementation of the third aspect, before the receiving, by the base station, a first communication resource request sent by the user equipment in an RRC connected state, the method further includes:

if the use mode of the first communication resource is the shared mode, broadcasting, by the base station, a third SIB, where the third SIB does not provide a second communication resource pool used for the second communication or a first communication resource pool used for the first communication, and the third SIB enables the user equipment in the RRC idle state to enter the RRC connected state, and send the first communication resource request to the base station; or if the use mode of the first communication resource is the independent mode, broadcasting, by the base station, a fourth SIB, where the fourth SIB does not provide a first communication resource pool used for the first communication, and the fourth SIB enables the user equipment in the RRC idle state to enter the RRC connected state, and send the first communication resource request to the base station; or if the use mode of the first communication resource is the independent mode, broadcasting, by the base station, a fifth SIB, where the fifth SIB includes a second communication resource pool used for the second communication and does not include an indication message instructing the user equipment to perform the first communication by using the second communication resource pool or includes an indication message used to indicate that the user equipment cannot perform the first communication by using the second communication resource pool, and the fifth SIB enables the user equipment in the RRC idle state to enter the RRC connected state, and send the first communication resource request to the base station; or broadcasting, by the base station, a sixth SIB, where the sixth SIB includes an indication message instructing the user equipment to enter the RRC connected state and send the first communication resource request to the base station to obtain the first communication resource, and the sixth SIB enables the user equipment in the RRC idle state to enter the RRC connected state, and send the first communication resource request to the base station.

With reference to any one of the third aspect to the third possible implementation of the third aspect, in a fourth possible implementation of the third aspect, the allocating, by the base station, the first communication resource to the user equipment in the RRC connected state according to the first communication resource request includes:

sending, by the base station to the user equipment by using first RRC signaling or a first Media Access Control control element MAC CE, an indication message instructing the user equipment to perform the first communication by using the second communication resource pool used for the second communication, so that the user equipment selects the first communication resource from the second communication resource pool; or sending, by the base station to the user equipment by using second RRC signaling or a second MAC CE, an indication message instructing the user equipment to reuse an SL-RNTI to obtain the first communication resource, where the SL-RNTI is an RNTI used to schedule the communication resource used for the second communication, so that the user equipment obtains, according to the SL-RNTI, the second communication resource allocated by the base station, and uses the second communication resource as the first communication resource.

With reference to any one of the third aspect to the third possible implementation of the third aspect, in a fifth possible implementation of the third aspect, before the allocating, by the base station, the first communication resource to the user equipment in the RRC connected state according to the first communication resource request, the method further includes:

sending, by the base station, a resource rejection message to the user equipment by using third RRC signaling or a third MAC CE, where the resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication; or skipping sending, by the base station, information about resource allocation, so that the user equipment determines that the first communication cannot be performed.

With reference to any one of the third aspect to the fifth possible implementation of the third aspect, in a sixth possible implementation of the third aspect, the allocating, by the base station, the first communication resource to the user equipment in the RRC connected state according to the first communication resource request includes:

sending, by the base station, the first communication resource pool to the user equipment by using fourth RRC signaling or a fourth MAC CE, so that the user equipment selects the first communication resource from the first communication resource pool; or sending, by the base station, a New-RNTI to the user equipment by using fifth RRC signaling or a fifth MAC CE, where the New-RNTI is an RNTI used to schedule the communication resource used for the first communication, so that the user equipment obtains the first communication resource according to the New-RNTI.

With reference to any one of the third aspect to the sixth possible implementation of the third aspect, in a seventh possible implementation of the third aspect, the first communication includes unicast D2D communication or relay communication, and the second communication includes multicast D2D communication.

With reference to any one of the third aspect to the seventh possible implementation of the third aspect, in an eighth possible implementation of the third aspect, the user equipment is remote user equipment or relay user equipment.

A fourth aspect of the present invention provides a method for controlling communication, where the communication is first communication, and the method includes:

sending, by a base station, information to user equipment by using RRC signaling or a MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool; or sending, by the base station to user equipment by using a PDCCH or an ePDCCH, a grant message that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication, so that the user equipment stops performing the first communication when obtaining, according to the corresponding SL-RNTI or New-RNTI, the indication message instructing to stop the first communication.

With reference to the fourth aspect, in a first possible implementation of the fourth aspect, the MAC CE includes a MAC PDU subheader of a particular logical channel index identifier; or the MAC CE includes an identifier of the user equipment whose first communication is stopped and/or indication information instructing the user equipment to stop the first communication.

With reference to the fourth aspect or the first possible implementation of the fourth aspect, in a second possible implementation of the fourth aspect, the first communication is unicast D2D communication or relay communication, and the second communication is multicast D2D communication.

With reference to any one of the fourth aspect to the second possible implementation of the fourth aspect, in a third possible implementation of the fourth aspect, the user equipment is remote user equipment or relay user equipment.

With reference to any one of the fourth aspect to the third possible implementation of the fourth aspect, in a fourth possible implementation of the fourth aspect, the method further includes:

receiving, by the base station, a measurement event reported by the user equipment, where the measurement event indicates that link quality and/or signal strength of receiving by the user equipment from the base station satisfy/satisfies a specific condition; and/or receiving, by the base station, a measurement result reported by the user equipment, and determining whether the measurement result satisfies a specific condition, where the measurement result includes RSRP and/or RSRQ.

A fifth aspect of the present invention provides user equipment, where the user equipment is configured to: when needing to perform first communication, obtain, from a base station, a first communication resource required for the first communication, and the user equipment includes:

a first obtaining module, configured to: when the user equipment is in an RRC idle state, obtain the first communication resource by receiving a system information block SIB broadcast by the base station; or the user equipment includes:

a state switching module, configured to: when the user equipment is in an RRC idle state, control the user equipment to enter an RRC connected state; and a sending module, configured to send a first communication resource request to the base station, where the first communication resource request is used to request the base station to allocate the first communication resource; or the sending module is further configured to: when the user equipment is in an RRC connected state, send a first communication resource request to the base station.

With reference to the fifth aspect, in a first possible implementation of the fifth aspect, the user equipment is configured to obtain the first communication resource according to a use mode of the first communication resource, where the use mode of the first communication resource includes a shared mode and an independent mode, where the shared mode means that the first communication resource and a second communication resource can be shared; or the independent mode means that the first communication resource and the second communication resource are used independently;

the use mode of the first communication resource is stipulated in a protocol, or configured by using an RRC message; and the second communication resource is a corresponding communication resource used when second communication is performed.

With reference to the fifth aspect or the first possible implementation of the fifth aspect, in a second possible implementation of the fifth aspect, the first obtaining module includes:

a first obtaining submodule, configured to: if the use mode of the first communication resource is the shared mode, and the SIB broadcast by the base station includes a second communication resource pool used for the second communication and includes an indication message instructing the user equipment to perform the first communication by using the second communication resource pool, enable the user equipment to remain in the RRC idle state, and obtain the first communication resource used for the first communication from the second communication resource pool that is used for the second communication and that is included in the SIB broadcast by the base station; or the first obtaining module includes:

a second obtaining submodule, configured to: if the use mode of the first communication resource is the independent mode, and the SIB broadcast by the base station includes a first communication resource pool used for the first communication, enable the user equipment to remain in the RRC idle state, and obtain the first communication resource used for the first communication from the first communication resource pool that is used for the first communication and that is included in the SIB broadcast by the base station.

With reference to the fifth aspect or the first possible implementation of the fifth aspect, in a third possible implementation of the fifth aspect, the state switching module is specifically configured to:

if the use mode of the first communication resource is the shared mode, and the SIB broadcast by the base station does not provide a second communication resource pool used for the second communication or a first communication resource pool used for the first communication, control the user equipment to enter the RRC connected state; or the state switching module is specifically configured to:

if the use mode of the first communication resource is the independent mode, and the SIB broadcast by the base station does not provide a first communication resource pool used for the first communication, control the user equipment to enter the RRC connected state; or the state switching module is specifically configured to:

if the use mode of the first communication resource is the independent mode, and the SIB broadcast by the base station includes a second communication resource pool used for the second communication and does not include an indication message instructing the user equipment to perform the first communication by using the second communication resource pool or includes an indication message used to indicate that the user equipment cannot perform the first communication by using the second communication resource pool, control the user equipment to enter the RRC connected state; or the state switching module is specifically configured to:

if the SIB broadcast by the base station includes an indication message instructing the user equipment to enter the RRC connected state and send the first communication resource request to the base station to obtain the first communication resource, control the user equipment to enter the RRC connected state.

With reference to any one of the fifth aspect to the third possible implementation of the fifth aspect, in a fourth possible implementation of the fifth aspect, the method further includes:

a first receiving module, configured to receive an indication message indicating that the base station instructs, by using first RRC signaling or a first Media Access Control control element MAC CE, the user equipment to perform the first communication by using the second communication resource pool used for the second communication; and a first selection module, configured to select the first communication resource from the second communication resource pool; or the user equipment further includes:

a second receiving module, configured to receive an indication message indicating that the base station instructs, by using second RRC signaling or a second MAC CE, the user equipment to reuse a sidelink-radio network temporary identifier SL-RNTI to obtain the first communication resource, where the SL-RNTI is an RNTI used to schedule the communication resource used for the second communication; and a second obtaining module, configured to obtain, according to the SL-RNTI, the second communication resource allocated by the base station, and use the second communication resource as the first communication resource.

With reference to any one of the fifth aspect to the third possible implementation of the fifth aspect, in a fifth possible implementation of the fifth aspect, the user equipment further includes:

a third receiving module, configured to receive a resource rejection message that is sent by the base station to the user equipment by using third RRC signaling or a third Media Access Control control element MAC CE, where the resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication; or the user equipment further includes:

a determining module, configured to: if the user equipment receives no information about resource allocation of the base station, determine that the first communication cannot be performed.

With reference to any one of the fifth aspect to the fifth possible implementation of the fifth aspect, in a sixth possible implementation of the fifth aspect, the user equipment further includes:

a fourth receiving module, configured to receive the first communication resource pool that is sent by the base station by using RRC signaling or a MAC CE; and a second selection module, configured to select the first communication resource from the first communication resource pool; or the user equipment further includes:

a fifth receiving module, configured to receive a new radio network temporary identifier New-RNTI that is sent by the base station by using fourth RRC signaling or a fourth MAC CE, where the New-RNTI is an RNTI used to schedule the communication resource used for the first communication; and a third obtaining module, configured to obtain the first communication resource according to the New-RNTI.

With reference to any one of the fifth aspect to the sixth possible implementation of the fifth aspect, in a seventh possible implementation of the fifth aspect, the first communication is unicast D2D communication or relay communication, and the second communication is multicast D2D communication.

With reference to any one of the fifth aspect to the seventh possible implementation of the fifth aspect, in an eighth possible implementation of the fifth aspect, the user equipment is remote user equipment or relay user equipment.

A sixth aspect of the present invention provides user equipment, where the user equipment is configured to perform first communication, and the user equipment includes:

a receiving module, configured to receive information that is sent by a base station by using fifth RRC signaling or a fifth MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool; and a communication control module, configured to: according to the information, stop the first communication or stop using the resource used for the first communication and/or stop using the configured New-RNTI used to schedule the communication resource used for the first communication and/or stop using the configured SL-RNTI used to schedule the communication resource used for the second communication; or the receiving module, configured to receive a grant message that is sent by a base station by using a PDCCH or an ePDCCH and that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication; and the communication control module, configured to: obtain, according to the corresponding SL-RNTI or New-RNTI, the indication message instructing to stop the first communication, and stop performing the first communication.

With reference to the sixth aspect, in a first possible implementation of the sixth aspect, the MAC CE includes a MAC PDU subheader of a particular logical channel index identifier; or the MAC CE includes an identifier of the user equipment whose first communication is stopped and/or indication information instructing the user equipment to stop the first communication.

With reference to the sixth aspect or the first possible implementation of the sixth aspect, in a second possible implementation of the sixth aspect, the first communication is unicast D2D communication or relay communication, and the second communication is multicast D2D communication.

With reference to any one of the sixth aspect to the second possible implementation of the sixth aspect, in a third possible implementation of the sixth aspect, the user equipment is remote user equipment or relay user equipment.

With reference to any one of the sixth aspect to the third possible implementation of the sixth aspect, in a fourth possible implementation of the sixth aspect, the user equipment further includes:

a sending module, configured to: report a measurement event to the base station, where the measurement event indicates that link quality and/or signal strength of receiving by the user equipment from the base station satisfy/satisfies a specific condition; and/or report a measurement result to the base station, where the measurement result includes RSRP and/or RSRQ.

A seventh aspect of the present invention provides a base station, where the base station is configured to allocate, to user equipment needing to perform first communication, a first communication resource required for the first communication, and the base station includes:

a sending module, configured to broadcast a SIB carrying the first communication resource, so that the user equipment in an RRC idle state obtains the first communication resource according to the SIB; or the base station includes:

a receiving module, configured to receive a first communication resource request sent by the user equipment in an RRC connected state; and an allocation module, configured to allocate the first communication resource to the user equipment in the RRC connected state according to the first communication resource request.

With reference to the seventh aspect, in a first possible implementation of the seventh aspect, that the base station allocates, to user equipment needing to perform first communication, a first communication resource required for the first communication includes:

allocating, by the base station, the first communication resource required for the first communication to the user equipment according to a use mode of the first communication resource, where the use mode of the first communication resource includes a shared mode and an independent mode, where the shared mode means that the first communication resource and a second communication resource can be shared; or the independent mode means that the first communication resource and the second communication resource are used independently;

the use mode of the first communication resource is stipulated in a protocol, or configured by using an RRC message; and the second communication resource is a corresponding communication resource used when second communication is performed.

With reference to the seventh aspect or the first possible implementation of the seventh aspect, in a second possible implementation of the seventh aspect, the sending module is specifically configured to: if the use mode of the first communication resource is the shared mode, broadcast a first SIB, where the first SIB includes a second communication resource pool used for the second communication and includes an indication message instructing the user equipment to perform the first communication by using the second communication resource pool, and the first SIB enables the user equipment in the RRC idle state to remain in the RRC idle state, and select the first communication resource from the second communication resource pool; or the sending module is specifically configured to:

if the use mode of the first communication resource is the independent mode, broadcast a second SIB, where the second SIB includes a first communication resource pool used for the first communication, and the second SIB enables the user equipment in the RRC idle state to remain in the RRC idle state, and select the first communication resource from the first communication resource pool.

With reference to the seventh aspect or the first possible implementation of the seventh aspect, in a third possible implementation of the seventh aspect, the sending module is further configured to: if the use mode of the first communication resource is the shared mode, broadcast a third SIB, where the third SIB does not provide a second communication resource pool used for the second communication or a first communication resource pool used for the first communication, and the third SIB enables the user equipment in the RRC idle state to enter the RRC connected state, and send the first communication resource request to the base station; or the sending module is further configured to:

if the use mode of the first communication resource is the independent mode, broadcast a fourth SIB, where the fourth SIB does not provide a first communication resource pool used for the first communication, and the fourth SIB enables the user equipment in the RRC idle state to enter the RRC connected state, and send the first communication resource request to the base station; or the sending module is further configured to:

if the use mode of the first communication resource is the independent mode, broadcast a fifth SIB, where the fifth SIB includes a second communication resource pool used for the second communication and does not include an indication message instructing the user equipment to perform the first communication by using the second communication resource pool or includes an indication message used to indicate that the user equipment cannot perform the first communication by using the second communication resource pool, and the fifth SIB enables the user equipment in the RRC idle state to enter the RRC connected state, and send the first communication resource request to the base station; or the sending module is further configured to:

broadcast a sixth SIB, where the sixth SIB includes an indication message instructing the user equipment to enter the RRC connected state and send the first communication resource request to the base station to obtain the first communication resource, and the sixth SIB enables the user equipment in the RRC idle state to enter the RRC connected state, and send the first communication resource request to the base station.

With reference to any one of the seventh aspect to the third possible implementation of the seventh aspect, in a fourth possible implementation of the seventh aspect, the allocation module includes:

a first sending unit, configured to send, to the user equipment by using first RRC signaling or a first Media Access Control control element MAC CE, an indication message instructing the user equipment to perform the first communication by using the second communication resource pool used for the second communication, so that the user equipment selects the first communication resource from the second communication resource pool; or the allocation module includes:

a second sending unit, configured to send, to the user equipment by using second RRC signaling or a second MAC CE, an indication message instructing the user equipment to reuse an SL-RNTI to obtain the first communication resource, where the SL-RNTI is an RNTI used to schedule the communication resource used for the second communication, so that the user equipment obtains, according to the SL-RNTI, the second communication resource allocated by the base station, and uses the second communication resource as the first communication resource.

With reference to any one of the seventh aspect to the third possible implementation of the seventh aspect, in a fifth possible implementation of the seventh aspect, the sending module is further configured to:

send a resource rejection message to the user equipment by using third RRC signaling or a third MAC CE, where the resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication; or the sending module is controlled to skip sending information about resource allocation, so that the user equipment determines that the first communication cannot be performed.

With reference to any one of the seventh aspect to the fifth possible implementation of the seventh aspect, in a sixth possible implementation of the seventh aspect, the allocation module includes:

a third sending unit, configured to send the first communication resource pool to the user equipment by using fourth RRC signaling or a fourth MAC CE, so that the user equipment selects the first communication resource from the first communication resource pool; or the allocation module includes:

a fourth sending unit, configured to send a New-RNTI to the user equipment by using fifth RRC signaling or a fifth MAC CE, where the New-RNTI is an RNTI used to schedule the communication resource used for the first communication, so that the user equipment obtains the first communication resource according to the New-RNTI.

With reference to any one of the seventh aspect to the sixth possible implementation of the seventh aspect, in a seventh possible implementation of the seventh aspect, the first communication includes unicast D2D communication or relay communication, and the second communication includes multicast D2D communication.

With reference to any one of the seventh aspect to the seventh possible implementation of the seventh aspect, in an eighth possible implementation of the seventh aspect, the user equipment is remote user equipment or relay user equipment.

An eighth aspect of the present invention provides a base station, where the base station is configured to control first communication, and the base station includes:

a first sending module, configured to send information to user equipment by using RRC signaling or a MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool; or the base station includes:

a second sending module, configured to send, to user equipment by using a PDCCH or an ePDCCH, a grant message that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication, so that the user equipment stops performing the first communication when obtaining, according to the corresponding SL-RNTI or New-RNTI, the indication message instructing to stop the first communication.

With reference to the eighth aspect, in a first possible implementation of the eighth aspect, the MAC CE includes a MAC PDU subheader of a particular logical channel index identifier; or the MAC CE includes an identifier of the user equipment whose first communication is stopped and/or indication information instructing the user equipment to stop the first communication.

With reference to the eighth aspect or the first possible implementation of the eighth aspect, in a second possible implementation of the eighth aspect, the first communication is unicast D2D communication or relay communication, and the second communication is multicast D2D communication.

With reference to any one of the eighth aspect to the second possible implementation of the eighth aspect, in a third possible implementation of the eighth aspect, the user equipment is remote user equipment or relay user equipment.

With reference to any one of the eighth aspect to the third possible implementation of the eighth aspect, in a fourth possible implementation of the eighth aspect, the base station further includes:

a receiving module, configured to: receive a measurement event reported by the user equipment, where the measurement event indicates that link quality and/or signal strength of receiving by the user equipment from the base station satisfy/satisfies a specific condition; and/or receive a measurement result reported by the user equipment, and determine whether the measurement result satisfies a specific condition, where the measurement result includes RSRP and/or RSRQ.

A ninth aspect of the present invention provides user equipment, where the user equipment is configured to: when needing to perform first communication, obtain, from a base station, a first communication resource required for the first communication, and the user equipment includes:

a processor, configured to: when the user equipment is in an RRC idle state, obtain the first communication resource by receiving a system information block SIB broadcast by the base station; or the processor, further configured to: when the user equipment is in an RRC idle state, control the user equipment to enter an RRC connected state; and the user equipment further includes a transmitter, configured to send a first communication resource request to the base station, where the first communication resource request is used to request the base station to allocate the first communication resource; or the transmitter, further configured to: when the user equipment is in an RRC connected state, send a first communication resource request to the base station.

With reference to the ninth aspect, in a first possible implementation of the ninth aspect, the user equipment is configured to obtain the first communication resource according to a use mode of the first communication resource, where the use mode of the first communication resource includes a shared mode and an independent mode, where the shared mode means that the first communication resource and a second communication resource can be shared; or the independent mode means that the first communication resource and the second communication resource are used independently;

the use mode of the first communication resource is stipulated in a protocol, or configured by using an RRC message; and the second communication resource is a corresponding communication resource used when second communication is performed.

With reference to the ninth aspect or the first possible implementation of the ninth aspect, in a second possible implementation of the ninth aspect, the processor is further configured to: if the use mode of the first communication resource is the shared mode, and the SIB broadcast by the base station includes a second communication resource pool used for the second communication and includes an indication message instructing the user equipment to perform the first communication by using the second communication resource pool, enable the user equipment to remain in the RRC idle state, and obtain the first communication resource used for the first communication from the second communication resource pool that is used for the second communication and that is included in the SIB broadcast by the base station; or the processor is further configured to: if the use mode of the first communication resource is the independent mode, and the SIB broadcast by the base station includes a first communication resource pool used for the first communication, enable the user equipment to remain in the RRC idle state, and obtain the first communication resource used for the first communication from the first communication resource pool that is used for the first communication and that is included in the SIB broadcast by the base station.

With reference to the ninth aspect or the first possible implementation of the ninth aspect, in a third possible implementation of the ninth aspect, the processor is further configured to:

if the use mode of the first communication resource is the shared mode, and the SIB broadcast by the base station does not provide a second communication resource pool used for the second communication or a first communication resource pool used for the first communication, control the user equipment to enter the RRC connected state; or the processor is further configured to:

if the use mode of the first communication resource is the independent mode, and the SIB broadcast by the base station does not provide a first communication resource pool used for the first communication, control the user equipment to enter the RRC connected state; or the processor is further configured to:

if the use mode of the first communication resource is the independent mode, and the SIB broadcast by the base station includes a second communication resource pool used for the second communication and does not include an indication message instructing the user equipment to perform the first communication by using the second communication resource pool or includes an indication message used to indicate that the user equipment cannot perform the first communication by using the second communication resource pool, control the user equipment to enter the RRC connected state; or the processor is further configured to:

if the SIB broadcast by the base station includes an indication message instructing the user equipment to enter the RRC connected state and send the first communication resource request to the base station to obtain the first communication resource, control the user equipment to enter the RRC connected state.

With reference to any one of the ninth aspect to the third possible implementation of the ninth aspect, in a fourth possible implementation of the ninth aspect, the user equipment further includes a receiver, where the receiver is configured to receive an indication message indicating that the base station instructs, by using first RRC signaling or a first Media Access Control control element MAC CE, the user equipment to perform the first communication by using the second communication resource pool used for the second communication; and the processor is further configured to select the first communication resource from the second communication resource pool; or the receiver is further configured to:

receive an indication message indicating that the base station instructs, by using second RRC signaling or a second MAC CE, the user equipment to reuse a sidelink-radio network temporary identifier SL-RNTI to obtain the first communication resource, where the SL-RNTI is an RNTI used to schedule the communication resource used for the second communication; and the processor is further configured to: receive, according to the SL-RNTI, the second communication resource allocated by the base station, and use the second communication resource as the first communication resource.

With reference to any one of the ninth aspect to the third possible implementation of the ninth aspect, in a fifth possible implementation of the ninth aspect, the receiver is further configured to receive a resource rejection message that is sent by the base station to the user equipment by using third RRC signaling or a third Media Access Control control element MAC CE, where the resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication; and the processor is further configured to: if the receiver receives no information about resource allocation of the base station, determine that the first communication cannot be performed.

With reference to any one of the ninth aspect to the fifth possible implementation of the ninth aspect, in a sixth possible implementation of the ninth aspect, the receiver is further configured to receive the first communication resource pool that is sent by the base station by using RRC signaling or a MAC CE; and the processor is further configured to select the first communication resource from the first communication resource pool; or the receiver is further configured to receive a new radio network temporary identifier New-RNTI that is sent by the base station by using fourth RRC signaling or a fourth MAC CE, where the New-RNTI is an RNTI used to schedule the communication resource used for the first communication; and the processor is further configured to obtain the first communication resource according to the New-RNTI.

With reference to any one of the ninth aspect to the sixth possible implementation of the ninth aspect, in a seventh possible implementation of the ninth aspect, the first communication is unicast D2D communication or relay communication, and the second communication is multicast D2D communication.

With reference to any one of the ninth aspect to the seventh possible implementation of the ninth aspect, in an eighth possible implementation of the ninth aspect, the user equipment is remote user equipment or relay user equipment.

A tenth aspect of the present invention provides user equipment, where the user equipment is configured to perform first communication, and the user equipment includes a receiver and a processor, where the receiver is configured to receive information that is sent by a base station by using fifth RRC signaling or a fifth MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool; and the processor is configured to: according to the information, stop the first communication or stop using the resource used for the first communication and/or stop using the configured New-RNTI used to schedule the communication resource used for the first communication and/or stop using the configured SL-RNTI used to schedule the communication resource used for the second communication; or the receiver is configured to receive a grant message that is sent by the base station by using a PDCCH or an ePDCCH and that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication; and the processor is configured to stop performing the first communication when obtaining, according to the corresponding SL-RNTI or New-RNTI, the indication message instructing to stop the first communication.

With reference to the tenth aspect, in a first possible implementation of the tenth aspect, the MAC CE includes a MAC PDU subheader of a particular logical channel index identifier; or the MAC CE includes an identifier of the user equipment whose first communication is stopped and/or indication information instructing the user equipment to stop the first communication.

With reference to the tenth aspect or the first possible implementation of the tenth aspect, in a second possible implementation of the tenth aspect, the first communication is unicast D2D communication or relay communication, and the second communication is multicast D2D communication.

With reference to any one of the tenth aspect to the second possible implementation of the tenth aspect, in a third possible implementation of the tenth aspect, the user equipment is remote user equipment or relay user equipment.

With reference to any one of the tenth aspect to the third possible implementation of the tenth aspect, in a fourth possible implementation of the tenth aspect, the user equipment further includes:

a transmitter, configured to: report a measurement event to the base station, where the measurement event indicates that link quality and/or signal strength of receiving by the user equipment from the base station satisfy/satisfies a specific condition; and/or report a measurement result to the base station, where the measurement result includes RSRP and/or RSRQ.

An eleventh aspect of the present invention provides a base station, where the base station is configured to allocate, to user equipment needing to perform first communication, a first communication resource required for the first communication, and the base station includes:

a transmitter, configured to broadcast a SIB carrying the first communication resource, so that the user equipment in an RRC idle state obtains the first communication resource according to the SIB; or the base station further includes:

a receiver, configured to receive a first communication resource request sent by the user equipment in an RRC connected state; and a processor, configured to allocate the first communication resource to the user equipment in the RRC connected state according to the first communication resource request.

With reference to the eleventh aspect, in a first possible implementation of the eleventh aspect, the base station allocates the first communication resource required for the first communication to the user equipment according to a use mode of the first communication resource, where the use mode of the first communication resource includes a shared mode and an independent mode, where the shared mode means that the first communication resource and a second communication resource can be shared; or the independent mode means that the first communication resource and the second communication resource are used independently;

the use mode of the first communication resource is stipulated in a protocol, or configured by using an RRC message; and the second communication resource is a corresponding communication resource used when second communication is performed.

With reference to the eleventh aspect or the first possible implementation of the eleventh aspect, in a second possible implementation of the eleventh aspect, the transmitter is further configured to: if the use mode of the first communication resource is the shared mode, broadcast a first SIB, where the first SIB includes a second communication resource pool used for the second communication and includes an indication message instructing the user equipment to perform the first communication by using the second communication resource pool, and the first SIB enables the user equipment in the RRC idle state to remain in the RRC idle state, and select the first communication resource from the second communication resource pool; or the transmitter is further configured to:

if the use mode of the first communication resource is the independent mode, broadcast a second SIB, where the second SIB includes a first communication resource pool used for the first communication, and the second SIB enables the user equipment in the RRC idle state to remain in the RRC idle state, and select the first communication resource from the first communication resource pool.

With reference to the eleventh aspect or the first possible implementation of the eleventh aspect, in a third possible implementation of the eleventh aspect, the transmitter is further configured to: if the use mode of the first communication resource is the shared mode, broadcast a third SIB, where the third SIB does not provide a second communication resource pool used for the second communication or a first communication resource pool used for the first communication, and the third SIB enables the user equipment in the RRC idle state to enter the RRC connected state, and send the first communication resource request to the base station; or the transmitter is further configured to:

if the use mode of the first communication resource is the independent mode, broadcast a fourth SIB, where the fourth SIB does not provide a first communication resource pool used for the first communication, and the fourth SIB enables the user equipment in the RRC idle state to enter the RRC connected state, and send the first communication resource request to the base station; or the transmitter is further configured to:

if the use mode of the first communication resource is the independent mode, broadcast a fifth SIB, where the fifth SIB includes a second communication resource pool used for the second communication and does not include an indication message instructing the user equipment to perform the first communication by using the second communication resource pool or includes an indication message used to indicate that the user equipment cannot perform the first communication by using the second communication resource pool, and the fifth SIB enables the user equipment in the RRC idle state to enter the RRC connected state, and send the first communication resource request to the base station; or the transmitter is further configured to:

broadcast a sixth SIB, where the sixth SIB includes an indication message instructing the user equipment to enter the RRC connected state and send the first communication resource request to the base station to obtain the first communication resource, and the sixth SIB enables the user equipment in the RRC idle state to enter the RRC connected state, and send the first communication resource request to the base station.

With reference to any one of the eleventh aspect to the third possible implementation of the eleventh aspect, in a fourth possible implementation of the eleventh aspect, the transmitter is further configured to:

send, to the user equipment by using first RRC signaling or a first Media Access Control control element MAC CE, an indication message instructing the user equipment to perform the first communication by using the second communication resource pool used for the second communication, so that the user equipment selects the first communication resource from the second communication resource pool; or the transmitter is further configured to send, to the user equipment by using second RRC signaling or a second MAC CE, an indication message instructing the user equipment to reuse an SL-RNTI to obtain the first communication resource, where the SL-RNTI is an RNTI used to schedule the communication resource used for the second communication, so that the user equipment obtains, according to the SL-RNTI, the second communication resource allocated by the base station, and uses the second communication resource as the first communication resource.

With reference to any one of the eleventh aspect to the third possible implementation of the eleventh aspect, in a fifth possible implementation of the eleventh aspect, the transmitter is further configured to:

send a resource rejection message to the user equipment by using third RRC signaling or a third MAC CE, where the resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication; or the transmitter is further configured to be controlled by the processor to skip sending information about resource allocation, so that the user equipment determines that the first communication cannot be performed.

With reference to any one of the eleventh aspect to the fifth possible implementation of the eleventh aspect, in a sixth possible implementation of the eleventh aspect, the transmitter is further configured to send the first communication resource pool to the user equipment by using fourth RRC signaling or a fourth MAC CE, so that the user equipment selects the first communication resource from the first communication resource pool; or the transmitter is further configured to send a New-RNTI to the user equipment by using fifth RRC signaling or a fifth MAC CE, where the New-RNTI is an RNTI used to schedule the communication resource used for the first communication, so that the user equipment obtains the first communication resource according to the New-RNTI.

With reference to any one of the eleventh aspect to the sixth possible implementation of the eleventh aspect, in a seventh possible implementation of the eleventh aspect, the first communication includes unicast D2D communication or relay communication, and the second communication includes multicast D2D communication.

With reference to any one of the eleventh aspect to the seventh possible implementation of the eleventh aspect, in an eighth possible implementation of the eleventh aspect, the user equipment is remote user equipment or relay user equipment.

A twelfth aspect of the present invention provides a base station, where the base station is configured to control first communication, and the base station includes a transmitter, where the transmitter is configured to send information to user equipment by using RRC signaling or a MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool; or the transmitter is further configured to:

send, to user equipment by using a PDCCH or an ePDCCH, a grant message that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication, so that the user equipment stops performing the first communication when obtaining, according to the corresponding SL-RNTI or New-RNTI, the indication message instructing to stop the first communication.

With reference to the twelfth aspect, in a first possible implementation of the twelfth aspect, the MAC CE includes a MAC PDU subheader of a particular logical channel index identifier; or the MAC CE includes an identifier of the user equipment whose first communication is stopped and/or indication information instructing the user equipment to stop the first communication.

With reference to the twelfth aspect or the first possible implementation of the twelfth aspect, in a second possible implementation of the twelfth aspect, the first communication is unicast D2D communication or relay communication, and the second communication is multicast D2D communication.

With reference to any one of the eighth aspect to the second possible implementation of the eighth aspect, in a third possible implementation of the eighth aspect, the user equipment is remote user equipment or relay user equipment.

With reference to any one of the twelfth aspect to the third possible implementation of the twelfth aspect, in a fourth possible implementation of the twelfth aspect, the user equipment further includes:

a receiver, configured to: receive a measurement event reported by the user equipment, where the measurement event indicates that link quality and/or signal strength of receiving by the user equipment from the base station satisfy/satisfies a specific condition; and/or receive a measurement result reported by the user equipment, and determine whether the measurement result satisfies a specific condition, where the measurement result includes RSRP and/or RSRQ.

According to the method for controlling communication, the user equipment, and the base station that are provided in the present invention, when needing to perform the first communication, the user equipment may obtain, from the base station in the following manner, the first communication resource required for the first communication: If the user equipment is in the RRC idle state, the user equipment obtains the first communication resource by receiving the SIB broadcast by the base station; if the user equipment is in the RRC idle state, the user equipment enters the RRC connected state and sends the first communication resource request to the base station to request the base station to allocate the first communication resource; or if the user equipment is in the RRC connected state, the user equipment directly sends the first communication resource request to the base station to request the base station to allocate the first communication resource. In this way, a coverage base station controls resource allocation for first communication of user equipment.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
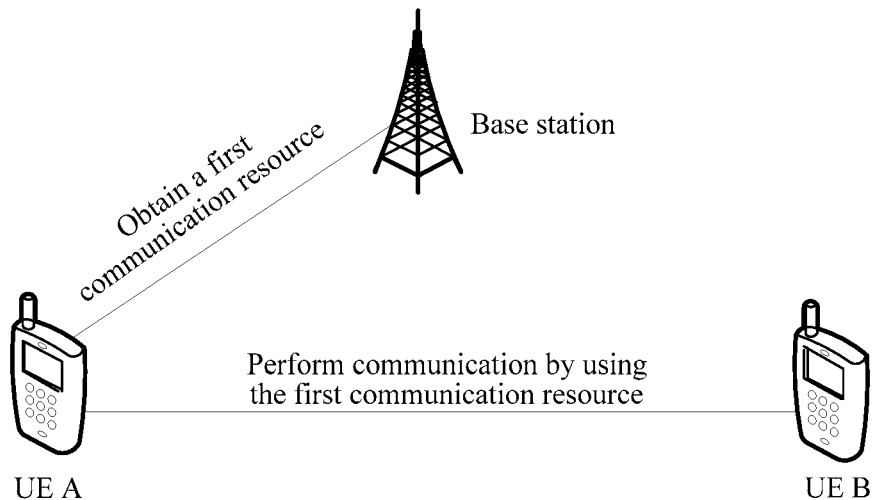
FIG. 1 is a schematic diagram of a communication scenario according to an embodiment of the present invention.

FIG. 1 is a schematic diagram of a communication scenario according to an embodiment of the present invention. Solutions of the present invention may be applied to a scenario in which user equipments perform D2D communication, and are especially applicable to first communication, for example, unicast D2D communication, that is, a one-to-one (one-to-one) D2D communication scenario, or relay D2D communication, that is, a D2D communication scenario of user equipment-to-network relay communication (UE-to-Network Relay). A communications network applicable to the solutions of the present invention may be a Long Term Evolution (Long Term Evolution, LTE for short) network. Correspondingly, in the LTE network, a base station shown in FIG. 1 may be an evolved NodeB (evolved Node B, eNB for short). As shown in FIG. 1, assuming that UE A intends to perform first communication with UE B, the UE A first needs to obtain a corresponding first communication resource, that is, a unicast communication resource or a relay communication resource, from the eNB, and further performs the first communication with the UE B by using the first communication resource.

Figure 2:
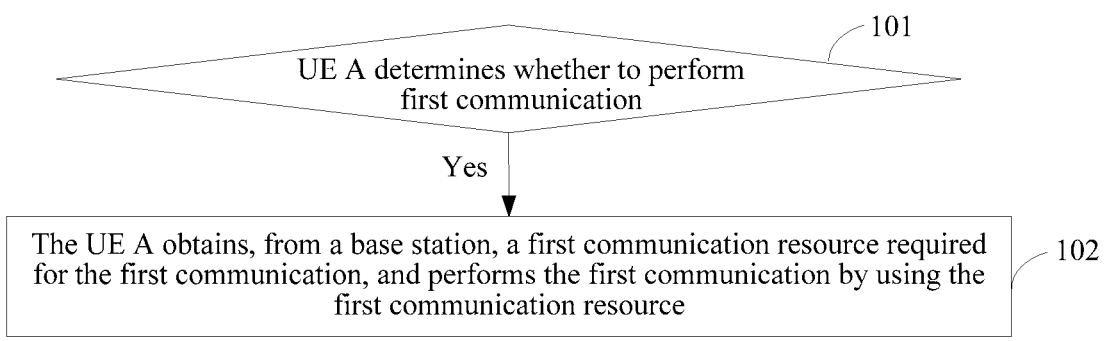
FIG. 2 is a flowchart of Embodiment 1 of a method for controlling communication according to an embodiment of the present invention.

FIG. 2 is a flowchart of Embodiment 1 of a method for controlling communication according to an embodiment of the present invention. As shown in FIG. 2, based on the communication scenario shown in FIG. 1, the solution is performed by UE A. The method for controlling communication includes the following specific steps.

Step 101. The UE A determines whether first communication needs to be performed, and if the first communication needs to be performed, performs step 102, or if the first communication does not need to be performed, ends the process.

In this embodiment, for the UE A, when a user of the UE A needs to communicate with another user (user equipment corresponding to the user is UE B), in a specific implementation, the user may select, by means of an APP, a specific communication manner for this communication. Optionally, optional communication manners on an APP interface, for example, include a base station forwarding manner, a multicast D2D manner, a unicast D2D manner, a relay communication manner, a Wi-Fi manner, or the like. When the UE A receives a corresponding instruction triggered when the user selects a first communication manner, the UE A determines that the UE A needs to perform the first communication with the UE B.

Step 102. The UE A obtains, from a base station, a first communication resource required for the first communication, and performs the first communication by using the first communication resource.

In this embodiment, when the UE A needs to perform the first communication, that is, unicast D2D communication or relay communication, with the UE B, the UE A may obtain the corresponding first communication resource, that is, a unicast communication resource or a relay communication resource, from a base station corresponding to the UE A. That is, a base station covering the UE A is responsible for controlling the unicast D2D communication or the relay communication of the UE A, including: allocating a unicast communication resource or a relay communication resource to the UE A.

When user equipment having a function of the first communication within coverage of the base station needs to perform the first communication, the user equipment may obtain a corresponding first communication resource from the coverage base station, so that the coverage base station controls resource allocation for the first communication of the user equipment.

The UE A may determine, according to a radio resource control (Radio Resource Control, RRC for short) status of the UE A, a manner of obtaining the first communication resource from the base station.

Specifically, optionally, in step 102, the UE A may obtain, from the base station in any one of the following manners, the first communication resource required for the first communication:

if the UE A is in an RRC idle state, the UE A obtains the first communication resource according to a detected system information block (System Information Block, SIB for short) broadcast by the base station; or if the UE A is in an RRC idle state, the UE A enters an RRC connected state, and sends a first communication resource request to the base station to request the base station to allocate the first communication resource; or if the UE A is in an RRC connected state, the UE A sends a first communication resource request to the base station.

In this embodiment, the user equipment may obtain the first communication resource according to a use mode of the first communication resource. The use mode of the first communication resource of the user equipment includes a shared mode and an independent mode. The shared mode means that the first communication resource and a second communication resource can be shared, and the independent mode means that the first communication resource and the second communication resource are used independently.

That is, the user equipment UE A may obtain the first communication resource from the base station by using the independent mode or the shared mode. The second communication resource is a corresponding communication resource used when second communication is performed. The second communication in this specification means multicast D2D communication, that is, one-to-many D2D communication. Correspondingly, a second communication resource pool in this specification is a group communication resource pool.

The use mode of the first communication resource is stipulated in a protocol, or configured by using an RRC message.

The following describes the foregoing several optional implementations with reference to several specific embodiments.

Figure 2A:
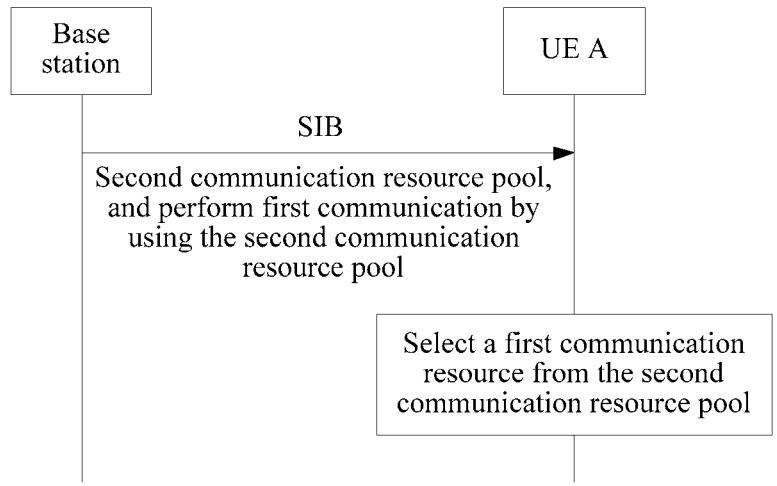
FIG. 2a is a signaling diagram of a specific implementation of step 102 in the embodiment shown in FIG. 2.

FIG. 2a is a signaling diagram of a specific implementation of step 102 in the embodiment shown in FIG. 2. When the UE A is in the RRC idle state, the UE A may obtain, according to a manner shown in FIG. 2a, the first communication resource by listening to the SIB broadcast by the base station.

Specifically, if the use mode of the first communication resource is the shared mode, the base station may broadcast the SIB. The SIB includes the second communication resource pool used for the second communication, and includes an indication message instructing the UE A to perform the first communication by using the second communication resource pool. Therefore, when detecting the SIB, the UE A selects the first communication resource from the second communication resource pool according to the indication message included in the SIB. In this case, the UE A still remains in the idle state.

The group communication resource pool includes multiple physical resource blocks used for the multicast D2D communication. The UE A may determine a quantity of needed physical resource blocks according to a size of D2D data needing to be sent by the UE A, and select a corresponding quantity of physical resource blocks as the first communication resource used for performing the first communication by the UE A.

In this embodiment, the base station can control the first communication to reuse the resource used for the multicast D2D communication, that is, the resource used for the second communication. When network load is relatively high, resource utilization can be improved especially.

Figure 2B:
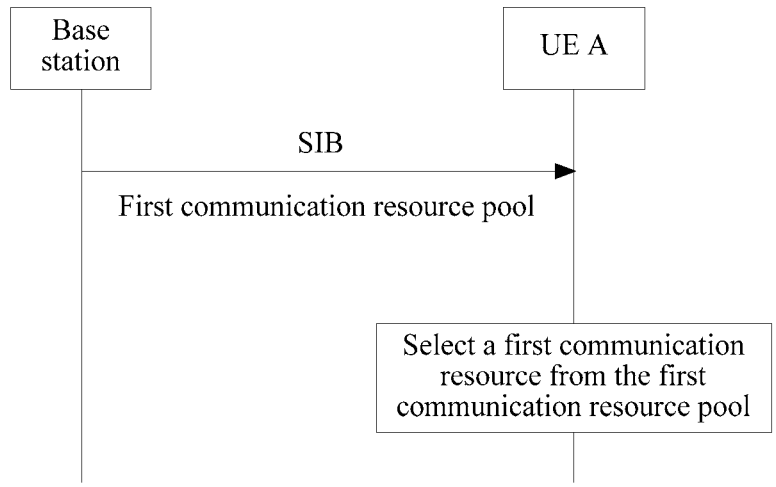
FIG. 2b is a signaling diagram of another specific implementation of step 102 in the embodiment shown in FIG. 2.

FIG. 2b is a signaling diagram of another specific implementation of step 102 in the embodiment shown in FIG. 2. When the UE A is in the RRC idle state, the UE A may obtain, according to a manner shown in FIG. 2b, the first communication resource by listening to the SIB broadcast by the base station.

Specifically, if the use mode of the first communication resource is the independent mode, the base station may broadcast the SIB. The SIB includes the first communication resource pool used for the first communication. Therefore, when detecting the SIB, the UE A may select the first communication resource from the first communication resource pool. In this case, the UE A still remains in the idle state.

It should be noted that, to be compatible with an existing protocol standard, the SIB may include two resource pools. One is a group communication resource pool in the existing protocol standard, and the other is the first communication resource pool, that is, a unicast communication resource pool or a relay communication resource pool. It may be understood that, in order that the user equipment can distinguish between the two resource pools, each resource pool has a corresponding identifier. Therefore, when detecting the SIB, the UE A may select the first communication resource from the first communication resource pool.

It may be understood that physical resource blocks included in the second communication resource pool do not overlap with physical resource blocks included in the first communication resource pool. That is, the base station allocates different resource pools for the multicast D2D communication and the first communication. This is opposite to a manner in FIG. 2a in which two types of D2D communication may share resources.

Similarly, the UE A may determine a quantity of needed physical resource blocks according to a size of D2D data needing to be sent by the UE A, and select a corresponding quantity of physical resource blocks from the first communication resource pool as the first communication resource used for performing the first communication by the UE A.

In this embodiment, the base station allocates the independent first communication resource pool for the first communication. This can avoid mutual interference between D2D user equipments to some extent, can better ensure quality of the first communication, and is especially applicable to a case of relatively low network load.

Figure 2C:
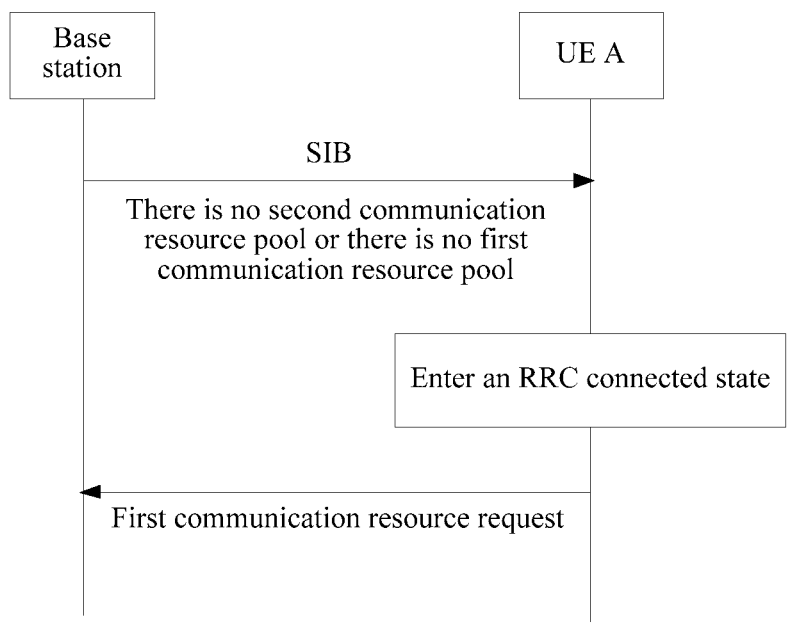
FIG. 2c is a signaling diagram of still another specific implementation of step 102 in the embodiment shown in FIG. 2.

FIG. 2c is a signaling diagram of still another specific implementation of step 102 in the embodiment shown in FIG. 2. When the UE A is in the RRC idle state, the UE A may obtain, according to a manner shown in FIG. 2c, the first communication resource in a manner of entering the connected state and sending the first communication resource request to the base station.

Specifically, if the use mode of the first communication resource is the shared mode, the base station broadcasts the SIB. The SIB does not provide the second communication resource pool used for the second communication or the first communication resource pool used for the first communication. Therefore, when detecting the SIB, the UE A enters the RRC connected state and sends the first communication resource request to the base station to obtain the first communication resource.

Figure 2D:
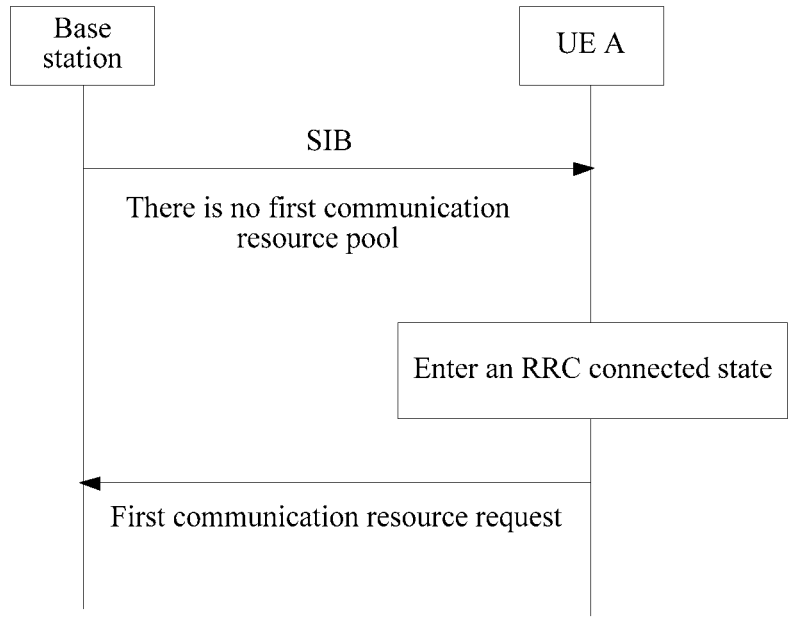
FIG. 2d is a signaling diagram of yet another specific implementation of step 102 in the embodiment shown in FIG. 2.

FIG. 2d is a signaling diagram of yet another specific implementation of step 102 in the embodiment shown in FIG. 2. When the UE A is in the RRC idle state, the UE A may obtain, according to a manner shown in FIG. 2d, the first communication resource in a manner of entering the connected state and sending the first communication resource request to the base station.

Specifically, if the use mode of the first communication resource is the independent mode, the base station broadcasts the SIB. The SIB does not provide the first communication resource pool used for the first communication. In this case, when detecting the SIB, the UE A enters the RRC connected state, and sends the first communication resource request to the base station.

Figure 2E:
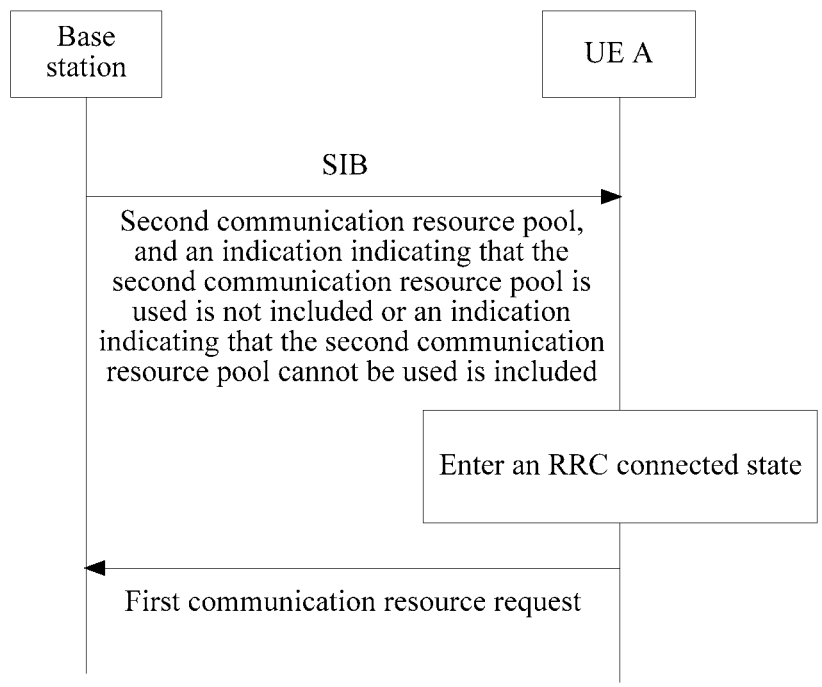
FIG. 2e is a signaling diagram of still yet another specific implementation of step 102 in the embodiment shown in FIG. 2.

FIG. 2e is a signaling diagram of still yet another specific implementation of step 102 in the embodiment shown in FIG. 2. When the UE A is in the RRC idle state, the UE A may obtain, according to a manner shown in FIG. 2d, the first communication resource in a manner of entering the connected state and sending the first communication resource request to the base station.

Specifically, if the use mode of the first communication resource is the independent mode, the base station may broadcast the SIB. The SIB includes the second communication resource pool used for the second communication, and does not include an indication message instructing the UE A to perform the first communication by using the group communication resource pool or includes an indication message used to indicate that the UE A cannot perform the first communication by using the second communication resource pool. Therefore, when detecting the SIB, the UE A enters the RRC connected state, and sends the first communication resource request to the base station to obtain the first communication resource.

That is, when the SIB detected by the UE A includes only the group communication resource pool, or includes the group communication resource pool and an indication message that is used to indicate that the first communication cannot be performed by using the group communication resource pool, the UE A enters the RRC connected state, and sends the first communication resource request to the base station.

Figure 2F:
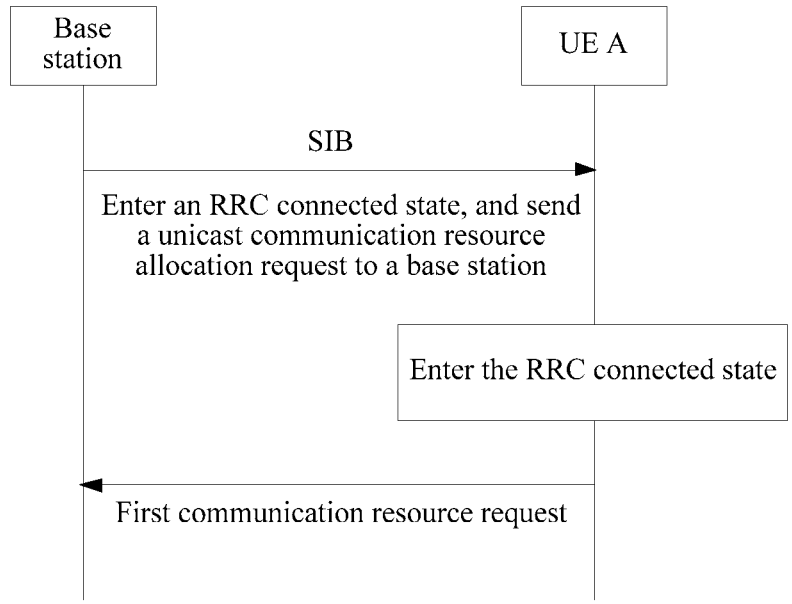
FIG. 2f is a signaling diagram of a further specific implementation of step 102 in the embodiment shown in FIG. 2.

FIG. 2f is a signaling diagram of a further specific implementation of step 102 in the embodiment shown in FIG. 2. When the UE A is in the RRC idle state, the UE A may obtain, according to a manner shown in FIG. 2f, the first communication resource in a manner of entering the connected state and sending the first communication resource request to the base station.

Specifically, the base station may broadcast the SIB. The SIB includes an indication message instructing the UE A to enter the RRC connected state and send the first communication resource request to the base station to obtain the first communication resource. Therefore, when detecting the SIB, the UE A enters the RRC connected state according to the indication message and sends the first communication resource request to the base station.

Figure 2G:
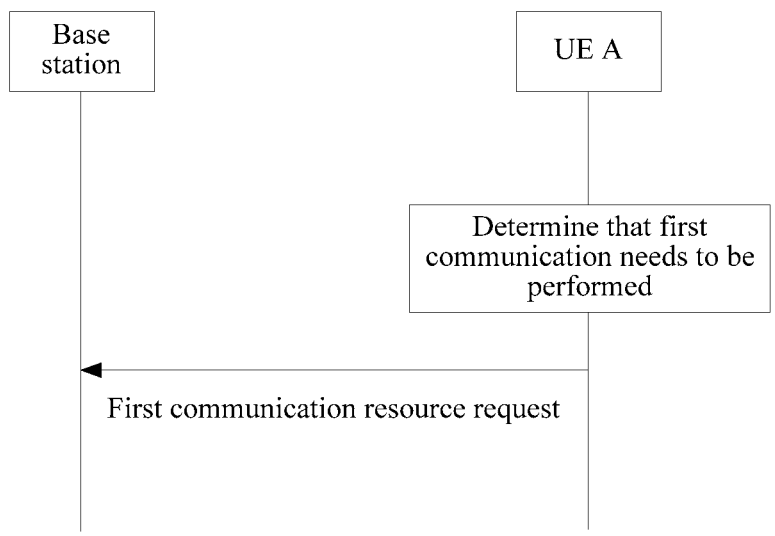
FIG. 2g is a signaling diagram of a still further specific implementation of step 102 in the embodiment shown in FIG. 2.

FIG. 2g is a signaling diagram of a still further specific implementation of step 102 in the embodiment shown in FIG. 2. When the UE A is in the RRC idle state, the UE A may obtain, according to a manner shown in FIG. 2g, the first communication resource in a manner of entering the connected state and sending the first communication resource request to the base station.

Specifically, when determining that the first communication needs to be performed, the UE A directly enters the connected state, and sends the first communication resource request to the base station to obtain the first communication resource.

In the embodiments in FIG. 2c to FIG. 2g, when the UE A is in the RRC idle state, the UE A may directly enter the RRC connected state according to a default setting when determining that the first communication needs to be performed, or may enter the RRC connected state according to an indication that is instructing to enter the connected state and that is in the detected SIB, or may enter the RRC connected state when the detected SIB does not include the first communication resource pool. After entering the RRC connected state, the UE A may request, in a manner of sending a request to the base station, the base station to allocate the first communication resource. Therefore, the base station can control, based on the foregoing different control manners, communication resource allocation for the first communication of the user equipment.

Based on the embodiments in FIG. 2c to FIG. 2g, after the UE A sends the first communication resource request to the base station, the base station may perform corresponding responding processing by using the following several optional implementations.

Figure 3A:
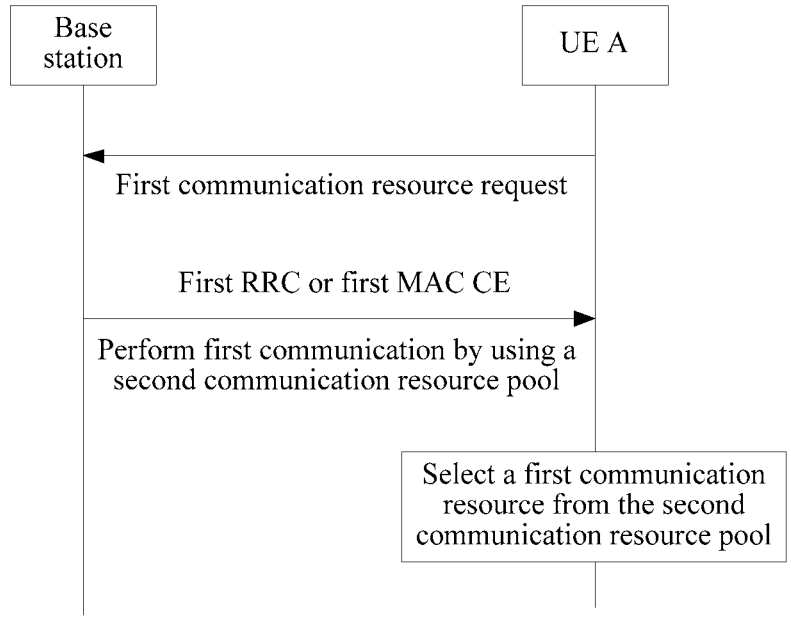
FIG. 3a is a signaling diagram of obtaining, by UE A, a first communication resource after the UE A enters an RRC connected state in FIG. 2c to FIG. 2g.

FIG. 3a is a signaling diagram of obtaining, by the UE A, the first communication resource after the UE A enters the RRC connected state in FIG. 2c to FIG. 2g. As shown in FIG. 3a, after entering the connected state, the UE A sends the first communication resource request to the base station. Specifically, the first communication resource request may include information such as a size of data needing to be sent by the UE A.

After receiving the first communication resource request, the base station may send, to the UE A by using dedicated signaling such as first RRC signaling or a first Media Access Control control element (Medium Access Control Element, MAC CE for short), an indication message instructing the UE A to perform the first communication by using the second communication resource pool used for the second communication. Further, the UE A selects the first communication resource from the second communication resource pool according to the indication message.

It should be noted that the base station has pre-allocated the second communication resource (that is, the multicast D2D communication resource), and the UE A has obtained the second communication resource pool (that is, the group communication resource pool). When the UE A requests, from the base station, the first communication resource required for the first communication, if the UE A receives the indication message fed back by the base station, it indicates that the UE A can reuse the group communication resource as the first communication resource. The UE A may select, from the group communication resource pool according to the size of the data needing to be sent, a corresponding quantity of physical resource blocks as the first communication resource for use. In this specification, the first communication includes unicast (one-to-one) D2D communication and relay communication, the first communication resource includes a unicast communication resource and a relay communication resource, and the second communication may be multicast D2D communication.

Figure 3B:
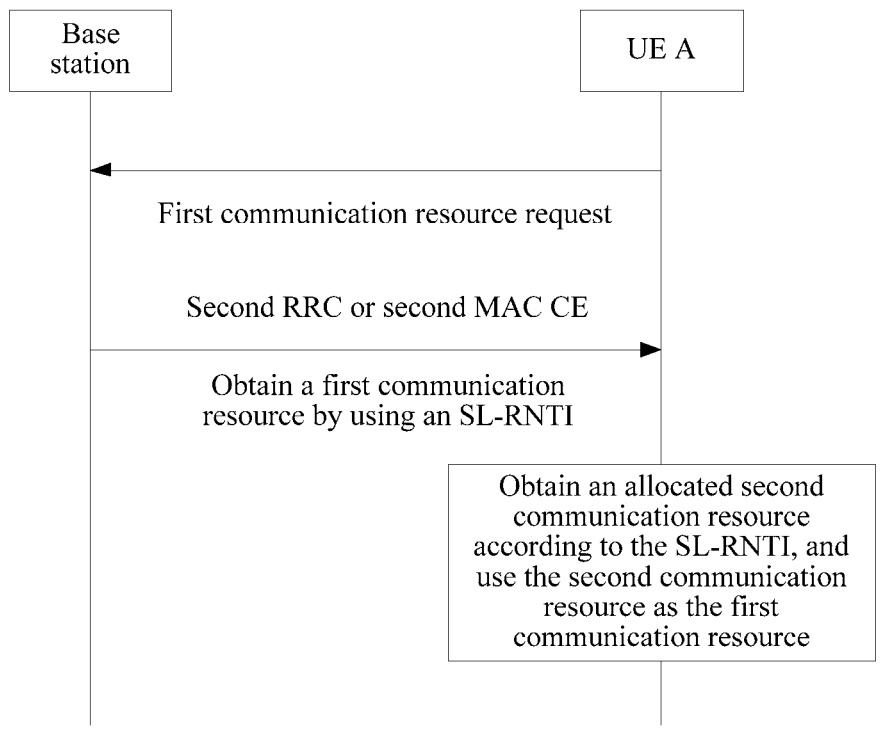
FIG. 3b is another signaling diagram of obtaining, by UE A, a first communication resource after the UE A enters an RRC connected state in FIG. 2c to FIG. 2g.

FIG. 3b is another signaling diagram of obtaining, by the UE A, the first communication resource after the UE A enters the RRC connected state in FIG. 2c to FIG. 2g. As shown in FIG. 3b, after entering the connected state, the UE A sends the first communication resource request to the base station. After receiving the first communication resource request, the base station may send, to the UE A by using dedicated signaling such as second RRC signaling or a second MAC CE, an indication message instructing the UE A to reuse a sidelink-radio network temporary identifier (SideLink-Radio Network Temporary Identity, SL-RNTI for short) to obtain the first communication resource. The UE A further obtains, according to the SL-RNTI, the second communication resource allocated by the base station, and uses the second communication resource as the first communication resource for the first communication.

The SL-RNTI is an RNTI used to schedule the communication resource used for the second communication, that is, the multicast D2D communication. That is, the SL-RNTI is an RNTI used when the base station allocates a group communication resource to the UE A. Therefore, that the base station sends the indication message means that the base station instructs the UE A to continue to use the SL-RNTI to obtain the group communication resource allocated by the base station and use the group communication resource as the first communication resource.

In the two manners in FIG. 3a and FIG. 3b, the base station still instructs the UE A to reuse the previously allocated group communication resource to perform the first communication.

Figure 3C:
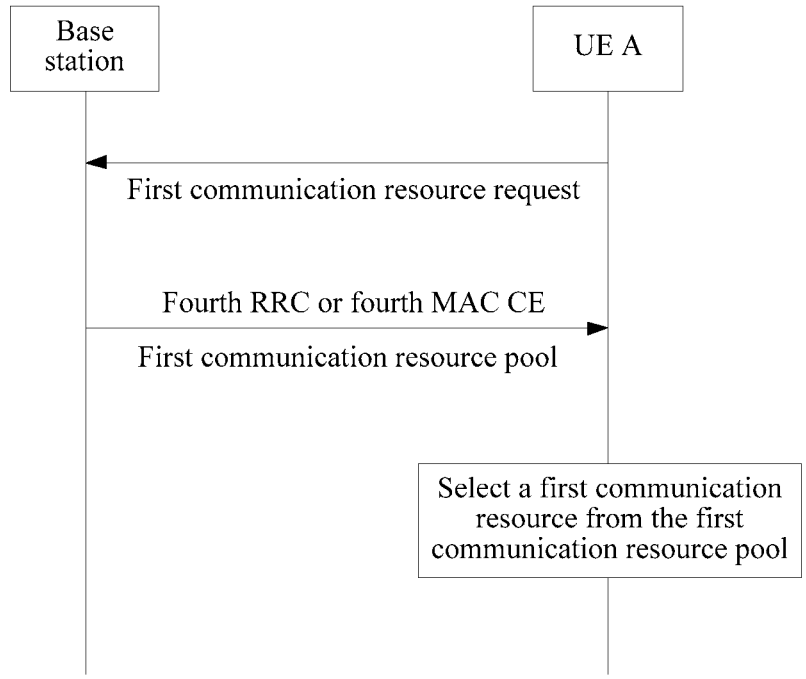
FIG. 3c is still another signaling diagram of obtaining, by UE A, a first communication resource after the UE A enters an RRC connected state in FIG. 2c to FIG. 2g.

FIG. 3c is still another signaling diagram of obtaining, by the UE A, the first communication resource after the UE A enters the RRC connected state in FIG. 2c to FIG. 2g. As shown in FIG. 3c, after entering the connected state, the UE A sends the first communication resource request to the base station. After receiving the first communication resource request, the base station may send the first communication resource pool to the UE A by using dedicated signaling such as fourth RRC signaling or a fourth MAC CE, and the UE A further selects the first communication resource from the first communication resource pool. The first communication resource pool is a resource pool that is allocated by the base station and that is dedicated for the first communication.

Figure 3D:
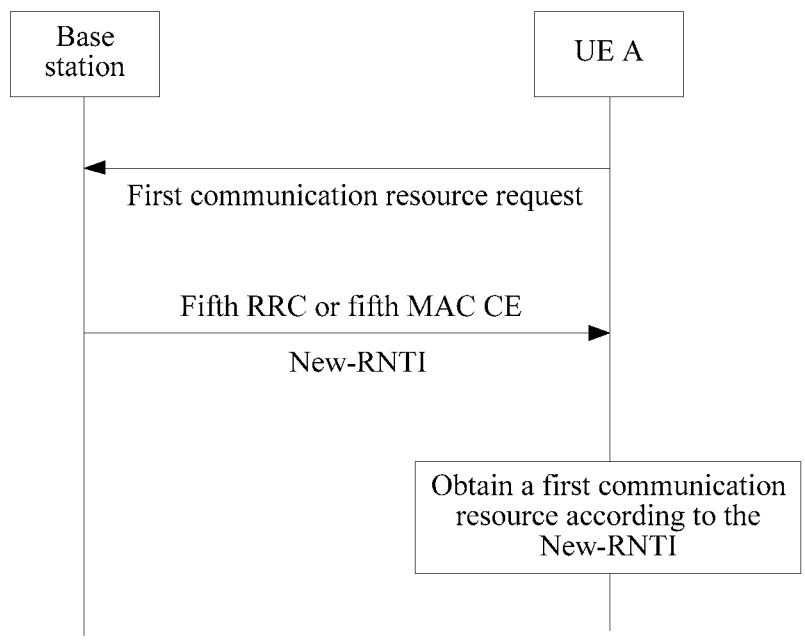
FIG. 3d is yet another signaling diagram of obtaining, by UE A, a first communication resource after the UE A enters an RRC connected state in FIG. 2c to FIG. 2g.

FIG. 3d is yet another signaling diagram of obtaining, by the UE A, the first communication resource after the UE A enters the RRC connected state in FIG. 2c to FIG. 2g. As shown in FIG. 3d, after entering the connected state, the UE A sends the first communication resource request to the base station. After receiving the first communication resource request, the base station may send a new radio network temporary identifier to the UE A by using dedicated signaling such as fifth RRC signaling or a fifth MAC CE, and may mark the RNTI as the New-RNTI. Optionally, the base station may send, to the UE A by using a physical downlink control channel (Physical Downlink Control Channel, PDCCH for short) or an enhanced physical downlink control channel (enhanced PDCCH, ePDCCH for short), scheduling information that is scrambled by using the New-RNTI. The New-RNTI is an RNTI used to schedule the communication resource used for the first communication, and the scheduling information includes the first communication resource scheduled by the base station for the first communication. Further, the UE A obtains the first communication resource according to the New-RNTI. That is, the New-RNTI is an RNTI used to schedule the communication resource used for the first communication, and the scheduling information includes the first communication resource scheduled by the base station for the first communication.

It should be noted that in the embodiments shown in FIG. 3c and FIG. 3d, after receiving the first communication resource request sent by the UE A, the base station may first determine whether to allow the UE A to perform the first communication. A determining basis may be, for example, whether current resources are sufficient. If the current resources are sufficient, the UE A may be allowed to perform the first communication, and the first communication resource is allocated to the UE A. On the contrary, if the current resources are insufficient, the UE A is not allowed to perform the first communication. Correspondingly, the base station may send a resource rejection message to the UE A by using RRC signaling or a MAC CE, or does not allocate a resource to the UE A.

Specifically, the base station sends the resource rejection message to the UE A by using third RRC signaling or a third MAC CE. The resource rejection message includes a resource rejection indication, and the resource rejection indication is instructing to forbid the UE A to use the second communication resource pool, and/or instruct to forbid the UE A to use an allocated SL-RNTI used to schedule the communication resource used for the second communication. Therefore, according to the resource rejection indication, the UE A does not use the second communication resource pool to perform the first communication, or does not use the SL-RNTI to schedule the corresponding resource to perform the first communication. Alternatively, if the UE A receives no information about resource allocation of the base station, it is determined that the first communication cannot be performed.

The foregoing embodiments may be applicable to an ordinary communication scenario shown in FIG. 1. In this scenario, the UE A is used as user equipment supporting D2D communication, and when the UE A needs to perform the first communication, the foregoing processing process is triggered. The following describes, with reference to another special scenario of the first communication, a special first communication manner: relay communication.

Figure 4:
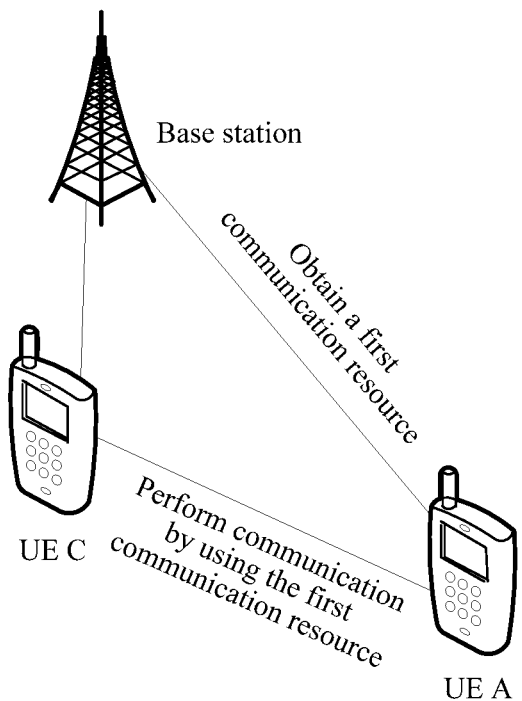
FIG. 4 is a schematic diagram of another communication scenario according to an embodiment of the present invention.

FIG. 4 is a schematic diagram of another communication scenario according to an embodiment of the present invention. As shown in FIG. 4, it is assumed that UE A and UE C both support D2D communication, and especially support first communication. The UE A is located within coverage of a base station, and is on an edge of the coverage of the base station. In this case, because the UE A is on the edge of the coverage of the base station, there is a greater risk that the UE A cannot access the base station. In this case, the UE A is remote user equipment, that is, remote UE A. It is assumed that the UE C can provide a relay service. The UE A may access the base station by using the UE C. In this case, the UE C is relay user equipment, that is, relay UE C. First communication between the remote UE A and the relay UE C is relay communication.

Figure 5:
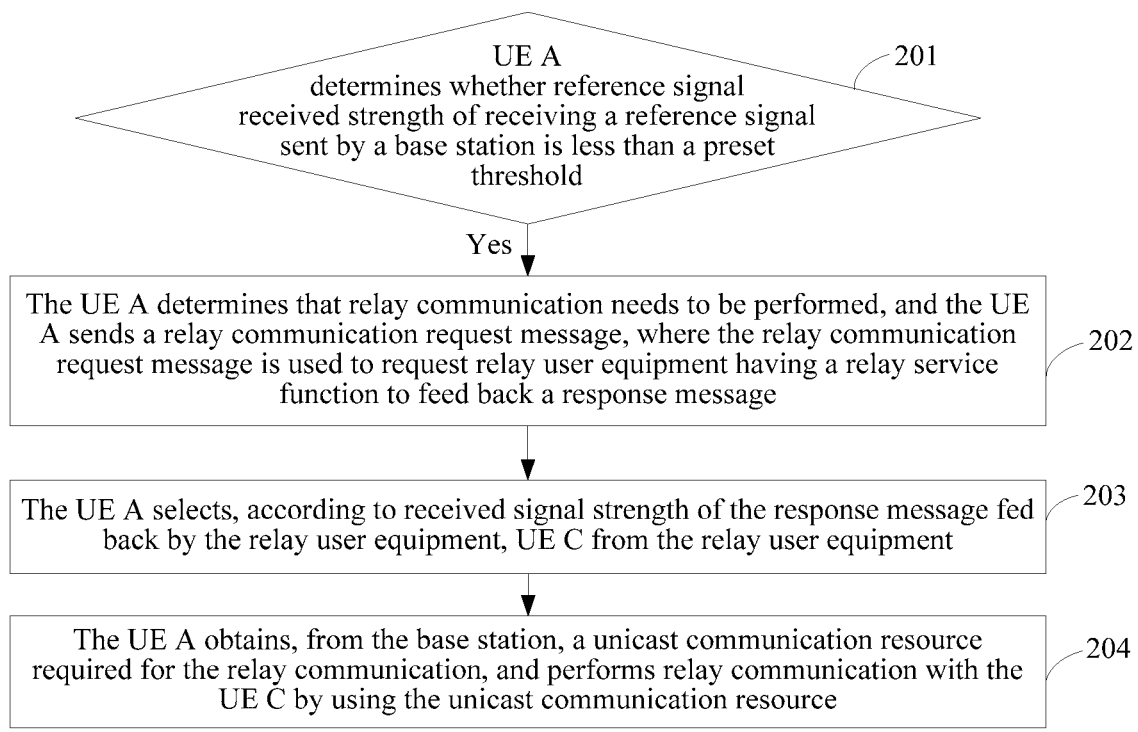
FIG. 5 is a flowchart of Embodiment 2 of a method for controlling communication according to an embodiment of the present invention.

FIG. 5 is a flowchart of Embodiment 2 of a method for controlling communication according to an embodiment of the present invention. As shown in FIG. 5, based on the communication scenario shown in FIG. 4, the solution is performed by UE A. The method for controlling communication includes the following specific steps.

Step 201. The UE A determines whether reference signal received strength of receiving a reference signal sent by a base station is less than a preset threshold, and if the reference signal received strength is less than the preset threshold, performs step 202, or if the reference signal received strength is not less than the preset threshold, ends the process.

If the reference signal received strength of receiving, by the UE A, the reference signal sent by the base station is less than the preset threshold, it indicates that the UE A is possibly located on an edge of coverage of the base station, and possibly cannot perform cellular communication by using the base station.

Step 202. The UE A determines that relay communication needs to be performed, and the UE A sends a communication request message, where the communication request message is used to request user equipment having a relay communication service function to feed back a response message.

Step 203. The UE A selects, according to received signal strength of the response message fed back by the user equipment having the relay communication service function, UE C from the user equipment having the relay communication service function.

The received signal strength of the response message corresponding to the UE C is the highest, and the UE C is configured to provide a relay communication service, that is, a relay service, for the UE A.

When it is determined that the UE A is located on the edge of the coverage of the base station, and cannot perform the cellular communication by using the base station, the UE A is triggered to access the base station in a relay communication manner.

In view of this, the UE A first needs to select, from multiple relay user equipments providing relay services in a cell, user equipment providing a relay service for the UE A. Specifically, the UE A may send a relay request message, that is, the communication request message. The relay request message is used to request the relay user equipments having the relay service functions to feed back response messages. Therefore, the UE A selects, from the relay user equipments according to received signal strength of the response messages fed back by the relay user equipments, the UE C having the highest received signal strength as the relay user equipment of the UE A.

It should be noted that for the multiple relay user equipments, the relay user equipments can provide relay functions, and it indicates that received power of the relay user equipments relative to the base station is usually greater than a specific threshold.

Step 204. The UE A obtains, from the base station, a first communication resource required for the relay communication, and performs the relay communication with the UE C by using the first communication resource.

After selecting the relay user equipment UE C, the UE A may obtain the first communication resource according to the manners in the foregoing embodiment, and further, perform the relay communication with the UE C by using the first communication resource. That is, the UE A sends to-be-sent data to the base station by using the UE C.

In this embodiment, when user equipment supporting D2D communication is located on an edge of coverage of a base station and cannot access the base station to perform cellular communication, a relay communication process of the user equipment is triggered. By means of the relay communication process, it is ensured that data of the user equipment can be sent successfully. In addition, because the relay communication belongs to D2D communication, the user equipment and the relay user equipment communicate with each other by using the first communication resource, thereby improving resource utilization.

Figure 6:
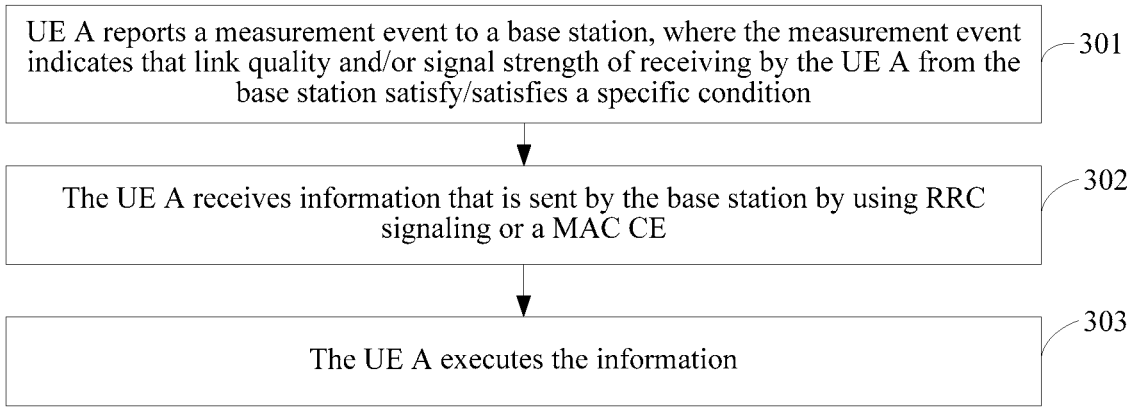
FIG. 6 is a flowchart of Embodiment 3 of a method for controlling communication according to an embodiment of the present invention.

FIG. 6 is a flowchart of Embodiment 3 of a method for controlling communication according to an embodiment of the present invention. As shown in FIG. 6, based on the communication scenario shown in FIG. 1 or FIG. 4, the solution is performed by UE A. The method for controlling communication includes the following specific steps.

Step 301. The UE A reports a measurement event to a base station, where the measurement event indicates that link quality and/or signal strength of receiving by the UE A from the base station satisfy/satisfies a specific condition.

Step 302. The UE A receives information that is sent by the base station by using RRC signaling or a MAC CE.

The information is instructing the UE A to stop first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool.

Step 303. The UE A performs the information.

That is, according to the information, the UE A stops the first communication or stops using the resource used for the first communication and/or stops using the configured New-RNTI used to schedule the communication resource used for the first communication and/or stops using the configured SL-RNTI used to schedule the communication resource used for the second communication.

In this embodiment, when the user equipment performs the first communication in a first communication manner, the base station may control the user equipment to stop continuing to perform communication in the first communication manner.

Specifically, for example, when detecting that radio resources of the base station are insufficient or the base station is overloaded, the base station may control the user equipment to stop performing communication in the first communication manner, thereby reducing load of the base station. In this case, step 301 is an optional step.

In addition, the UE A communicates with UE B by using the first communication resource, or the UE A reports the measurement event to the base station after accessing a network by using UE C and when detecting the measurement event. The measurement event indicates that quality of a channel between the UE A and the base station is good, and the UE A may perform cellular communication by using the base station, and does not need to access the network in a relay manner by using the UE C or perform unicast D2D communication with the UE B. In this case, the base station is triggered to control the UE A to stop continuing to perform communication in the first communication manner.

In addition, the base station may further determine, based on a measurement result reported by the user equipment UE A, whether to control the UE A to stop continuing to perform communication in the first communication manner. Specifically, using the scenario in FIG. 4 as an example, after accessing the network by using the UE C, the UE A may periodically detect, for example, reference signal received power (RSRP) and/or reference signal received quality (Reference Signal Receiving Quality, RSRQ for short), and report the measurement result to the base station. When determining, according to the measurement result, that corresponding PSRP and RSRQ satisfy a specific condition, that is, are greater than a specific threshold, the base station controls the UE A to stop continuing to perform communication in a relay communication manner.

It should be noted that the base station may make, according to one of the measurement event or the measurement result, a control decision of controlling to stop the first communication. Alternatively, the base station may make, according to the measurement event and the measurement result, a control decision of controlling to stop the first communication. That is, the control decision of controlling to stop the first communication is made only when the measurement event is satisfied and the measurement result satisfies the specific condition.

For the UE A in the scenario of FIG. 4, when the UE A is on an edge of coverage of the base station, the UE A cannot implement the cellular communication by using the base station, and therefore performs relay communication. If the base station finds, based on the measurement event or the measurement result of the UE A, that the received power of the UE A is greater than a specific threshold or the signal strength of the UE A is greater than a specific threshold, the UE A has moved within the coverage. In this case, because the UE A already can perform the cellular communication by using the base station, the base station may control the UE A to stop the relay communication. For the UE C, the base station may control, when detecting that relay load of the UE C is quite low, the UE C to stop the relay communication, to avoid a problem that the first communication resource cannot be used fully.

Specifically, the base station may send the information to the user equipment by using dedicated signaling such as RRC signaling or a MAC CE.

The MAC CE includes a MAC PDU subheader of a particular logical channel index identifier, or the MAC CE includes an identifier of the user equipment UE A whose first communication is stopped and/or indication information instructing the UE A to stop the first communication.

The MAC CE may be designed as in the following table. An index (index) of a MAC packet data unit (packet data unit, PDU for short) subheader and a logical channel identifier (logical channel identify, LCID for short) value are used to stop the relay communication.

| Index | LCID |
| --- | --- |
| 00000 | Reserved |
| 00001-01010 | Logical channel identifier |
| 01011 | Relay stopping command |
| 01100-11110 | Reserved |
| 11111 | Filler |

The foregoing embodiment is further applicable to a scenario in which the base station stops a unicast communication link of user equipment performing unicast communication.

In this embodiment, based on a resource status and a load status of the base station or based on a detected network access status of the user equipment, the base station may control the user equipment performing the first communication to stop performing communication in the first communication manner or may control to forbid the user equipment to perform the first communication by using the foregoing related resource.

Figure 7:
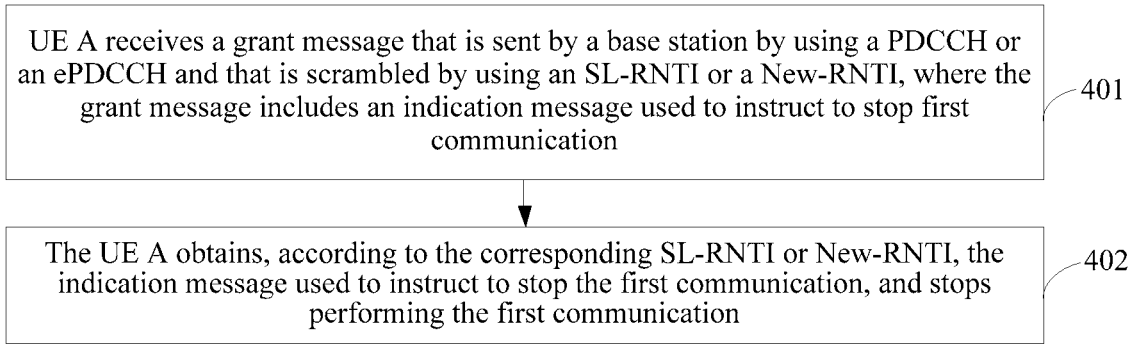
FIG. 7 is a flowchart of Embodiment 4 of a method for controlling communication according to an embodiment of the present invention.

FIG. 7 is a flowchart of Embodiment 4 of a method for controlling communication according to an embodiment of the present invention. As shown in FIG. 7, based on the communication scenario shown in FIG. 1 or FIG. 4, the solution is performed by UE A. The method for controlling communication includes the following specific steps.

Step 401. The UE A receives a grant message that is sent by a base station by using a PDCCH or an ePDCCH and that is scrambled by using an SL-RNTI or a New-RNTI, where the grant message includes an indication message instructing to stop first communication.

The SL-RNTI is an RNTI used to schedule a communication resource used for second communication, that is, multicast D2D communication. The New-RNTI is an RNTI used to schedule a communication resource used for the first communication.

The grant message is a grant message used for resource allocation.

Step 402. The UE A obtains, according to the corresponding SL-RNTI or New-RNTI, the indication message instructing to stop the first communication, and stops performing the first communication.

In this embodiment, when the user equipment performs the first communication in a first communication manner, the base station may control the user equipment to stop continuing to perform communication in the first manner.

A condition for making, by the base station, a decision of stopping the first communication is consistent with that in the foregoing embodiment, and details are not described again. A difference from the foregoing embodiment lies in that the base station controls, in a different manner, the user equipment to stop the first communication.

Specifically, the base station may send, to the user equipment by using the PDCCH or the ePDCCH, the grant message that is scrambled by using the SL-RNTI or the New-RNTI. The grant message includes the indication message instructing to stop the first communication.

It should be noted that the SL-RNTI and the New-RNTI correspond to user equipment. That is, if the user equipment is the UE A, the SL-RNTI and the New-RNTI correspond to the UE A.

In addition, the SL-RNTI and the New-RNTI are related to a manner in which the base station allocates a first communication resource to the user equipment. If the manner in which the base station allocates the first communication resource to the user equipment is instructing the user equipment to obtain the first communication resource according to the SL-RNTI, that is, instructing the user equipment to reuse a multicast communication resource, when the base station stops the first communication of the user equipment, the base station sends the SL-RNTI to the user equipment. If the manner in which the base station allocates the first communication resource to the user equipment is instructing the user equipment to obtain the first communication resource according to the New-RNTI, that is, instructing the user equipment to obtain, according to the New-RNTI, an independent first communication resource that is allocated by the base station to the user equipment, when the base station stops the first communication of the user equipment, the base station sends the New-RNTI to the user equipment.

After receiving the grant message, the user equipment obtains, according to the corresponding SL-RNTI or New-RNTI used when the user equipment obtains the first communication resource, the indication message that is instructing to stop the first communication and that is included in the grant message, and stops the first communication according to the indication message.

In this embodiment, based on a resource status and a load status of the base station or based on a detected network access status of the user equipment, the base station may control the user equipment performing the first communication to stop performing communication in the first communication manner.

The foregoing embodiments are described from the perspective of user equipment as an execution body, and the following describes a processing process of a base station from the perspective of the base station as an execution body.

In the solution of the present invention, the base station may allocate, to user equipment needing to perform first communication, a first communication resource required for the first communication, so that the user equipment performs the first communication by using the first communication resource.

Specifically, the base station may allocate, in a manner of broadcasting a SIB or in a manner of requesting, by the user equipment, to allocate the first communication resource, the first communication resource to the user equipment needing to perform the first communication.

Optionally, the base station broadcasts the SIB carrying the first communication resource, so that the user equipment in an RRC idle state obtains the first communication resource according to the SIB.

Alternatively, optionally, the base station receives a first communication resource request sent by the user equipment in an RRC connected state, and the base station allocates the first communication resource to the user equipment in the RRC connected state according to the first communication resource request.

It should be noted that in this embodiment of the present invention, in a case of no ambiguity, the user equipment is user equipment needing to perform the first communication, but is not user equipment performing cellular communication. In addition, in this embodiment, the first communication is unicast D2D communication or relay communication, and the second communication is multicast D2D communication. Correspondingly, the first communication resource is a unicast communication resource or a relay communication resource. The following second communication resource pool is a group communication resource pool, that is, a communication resource pool used for the multicast D2D communication.

In addition, in this embodiment, the base station may allocate the first communication resource required for the first communication to the user equipment according to a use mode of the first communication resource. The use mode of the first communication resource includes a shared mode and an independent mode. The shared mode means that the first communication resource and a second communication resource can be shared, and the independent mode means that the first communication resource and the second communication resource are used independently. The use mode of the first communication resource is stipulated in a protocol, or configured by using an RRC message.

The following describes, with reference to several specific implementations, a processing process of allocating, by the base station, the first communication resource.

Manner 1: If the use mode of the first communication resource is the shared mode, the base station broadcasts a first SIB. The first SIB includes the second communication resource pool used for the second communication, and includes an indication message instructing the user equipment to perform the first communication by using the group communication resource pool.

Therefore, after detecting the first SIB, the user equipment in the RRC idle state selects the first communication resource from the second communication resource pool, and the user equipment still remains in the RRC idle state.

Manner 1 corresponds to the embodiment shown in FIG. 2*a*, and a specific processing process is not described in detail again.

Manner 2: If the use mode of the first communication resource is the independent mode, the base station broadcasts a second SIB. The second SIB includes a first communication resource pool used for the first communication.

Therefore, after detecting the second SIB, the user equipment in the RRC idle state selects the first communication resource from the first communication resource pool, and the user equipment still remains in the RRC idle state.

Manner 2 corresponds to the embodiment shown in FIG. 2*b*, and a specific processing process is not described in detail again.

Manner 3: If the use mode of the first communication resource is the shared mode, the base station broadcasts a third SIB. The third SIB does not provide the second communication resource pool used for the second communication or a first communication resource pool used for the first communication.

Therefore, after detecting the third SIB, the user equipment in the RRC idle state enters the RRC connected state, and sends the first communication resource request to the base station.

Manner 3 corresponds to the embodiment shown in FIG. 2c, and a specific processing process is not described in detail again.

Manner 4: If the use mode of the first communication resource is the independent mode, the base station broadcasts a fourth SIB. The fourth SIB does not provide a first communication resource pool used for the first communication.

Therefore, after detecting the fourth SIB, the user equipment in the RRC idle state enters the RRC connected state, and sends the first communication resource request to the base station.

Manner 4 corresponds to the embodiment shown in FIG. 2d, and a specific processing process is not described in detail again.

Manner 5: If the use mode of the first communication resource is the independent mode, the base station broadcasts a fifth SIB. The fifth SIB includes the second communication resource pool used for the second communication, and does not include an indication message instructing the user equipment to perform the first communication by using the second communication resource pool or includes an indication message used to indicate that the user equipment cannot perform the first communication by using the second communication resource pool.

Therefore, after detecting the fifth SIB, the user equipment in the RRC idle state enters the RRC connected state, and sends the first communication resource request to the base station, to request the base station to allocate the first communication resource to the user equipment.

Manner 5 corresponds to the embodiment shown in FIG. 2e, and a specific processing process is not described in detail again.

Manner 6: The base station broadcasts a sixth SIB. The sixth SIB includes an indication message instructing the user equipment to enter the RRC connected state and send the first communication resource request to the base station to obtain the first communication resource.

Therefore, after detecting the sixth SIB, the user equipment in the RRC idle state enters the RRC connected state, and sends the first communication resource request to the base station.

Manner 6 corresponds to the embodiment shown in FIG. 2f, and a specific processing process is not described in detail again.

Manner 7: The user equipment in the RRC idle state directly enters the RRC connected state, and sends the first communication resource request to the base station.

Manner 7 corresponds to the embodiment shown in FIG. 2g, and a specific processing process is not described in detail again.

In manner 3 to manner 6, after the user equipment enters the RRC connected state from the RRC idle state, and sends the first communication resource request to the base station, or the user equipment remaining in the RRC connected state directly sends the first communication resource request to the base station, the base station allocates the first communication resource to the user equipment in the RRC connected state according to the first communication resource request. A specific implementation includes the following:

Manner 1: The base station sends, to the user equipment by using first RRC signaling or a first MAC CE, an indication message instructing the user equipment to perform the first communication by using the second communication resource pool used for the second communication.

Therefore, the user equipment selects the first communication resource from the second communication resource pool.

Manner 1 corresponds to the embodiment shown in FIG. 3a, and a specific processing process is not described in detail again.

Manner 2: The base station sends, to the user equipment by using second RRC signaling or a second MAC CE, an indication message instructing the user equipment to reuse an SL-RNTI to obtain the first communication resource.

The SL-RNTI is an RNTI used to schedule a communication resource used for the second communication.

Therefore, the user equipment obtains, according to the SL-RNTI, the second communication resource allocated by the base station, and uses the second communication resource as the first communication resource.

Manner 2 corresponds to the embodiment shown in FIG. 3b, and a specific processing process is not described in detail again.

Manner 3: The base station sends the first communication resource pool to the user equipment by using fourth RRC signaling or a fourth MAC CE.

Therefore, the user equipment selects the first communication resource from the first communication resource pool.

Manner 3 corresponds to the embodiment shown in FIG. 3c, and a specific processing process is not described in detail again.

Manner 4: The base station sends a New-RNTI to the user equipment by using fifth RRC signaling or a fifth MAC CE.

The New-RNTI is an RNTI used to schedule the communication resource used for the first communication.

Further, the user equipment obtains the first communication resource according to the New-RNTI.

Manner 4 corresponds to the embodiment shown in FIG. 3d, and a specific processing process is not described in detail again.

It should be noted that, before the base station allocates the first communication resource to the user equipment in the RRC connected state according to the first communication resource request, the base station may first determine whether to allow the UE A to perform the first communication. A determining basis may be, for example, whether current resources are sufficient. If the current resources are sufficient, the UE A may be allowed to perform the first communication, and the first communication resource is allocated to the UE A. On the contrary, if the current resources are insufficient, the UE A is not allowed to perform the first communication. Correspondingly, the base station may send a resource rejection message to the UE A by using RRC signaling or a MAC CE, or does not allocate a resource to the UE A.

Specifically, the base station sends the resource rejection message to the UE A by using third RRC signaling or a third MAC CE. The resource rejection message includes a resource rejection indication, and the resource rejection indication is instructing to forbid the UE A to use the second communication resource pool, and/or instruct to forbid the UE A to use an allocated SL-RNTI used to schedule the communication resource used for the second communication. Therefore, according to the resource rejection indication, the UE A does not use the second communication resource pool to perform the first communication, or does not use the SL-RNTI to obtain a corresponding resource to perform the first communication. Alternatively, if the UE A receives no information about resource allocation of the base station, it is determined that the first communication cannot be performed.

The foregoing implementations describe an implementation of allocating, by the base station, the first communication resource to the user equipment. A communication scenario to which the implementation is applicable may be shown in FIG. 1 or FIG. 4. The user equipment corresponds to the UE A or the UE C. In the scenario of FIG. 4, the first communication is specifically relay communication. When determining that reference signal received strength of receiving a reference signal sent by the base station is less than a preset threshold, the UE A determines that the relay communication needs to be performed. Therefore, the first communication resource needed by the user to perform the relay communication may be obtained with reference to the foregoing implementations, so as to perform the relay communication with the UE C. In FIG. 4, a manner in which the UE C obtains the first communication resource is the same as a manner in which the UE A obtains the first communication resource.

The base station may allocate the first communication resource to the user equipment to implement resource control for the first communication, and the base station may further control the first communication of the user equipment by stopping the first communication of the user equipment.

The following describes, with reference to the communication scenario shown in FIG. 1 or FIG. 4, how a base station controls user equipment to stop first communication.

For the UE A in the communication scenario, first communication of the UE A may be stopped in the following manner a or manner b. The manner a and the manner b are also applicable to the UE C, and repeated parts are not described again.

Manner a: The base station sends information to the UE A by using RRC signaling or a MAC CE.

The information is instructing the UE A to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool.

Therefore, the UE A executes the information.

Manner a corresponds to the embodiment shown in FIG. 6, and a specific processing process is not described in detail again.

Manner b: The base station may send, to the UE A by using a PDCCH or an ePDCCH, a grant message that is scrambled by using an SL-RNTI or a New-RNTI. The grant message includes an indication message instructing to stop the first communication.

The SL-RNTI is an RNTI used to schedule a communication resource used for second communication. The New-RNTI is an RNTI used to schedule a communication resource used for the first communication. Therefore, when obtaining, according to the corresponding SL-RNTI or New-RNTI, the indication message instructing to stop the first communication, the UE A stops performing the first communication.

When the grant message is sent to the UE A, the SL-RNTI and the New-RNTI correspond to the UE A. When the grant message is sent to the UE C, the SL-RNTI and the New-RNTI correspond to the UE C.

Manner b corresponds to the embodiment shown in FIG. 7, and a specific processing process is not described in detail again.

It should be noted that, in manner a and manner b, the base station may determine, based on the following manner, whether to perform manner a and manner b.

Specifically, for manner a, the base station may control, when detecting that radio resources of the base station are insufficient or the base station is overloaded, the user equipment to stop performing communication in a first communication manner, thereby reducing load of the base station.

In addition, the base station may further determine, based on a measurement event and/or a measurement result reported by the user equipments (the UE A and the UE C), whether to perform manner a and manner b.

Specifically, the UE A in the communication scenario shown in FIG. 4 is used as an example; after the UE A accesses a network by using the UE C, when the measurement event is measured, the measurement event is reported to the base station. The measurement event indicates that quality of a channel between the UE A and the base station is good, and the UE A may perform cellular communication by using the base station, and does not need to access the network in a relay manner by using the UE C. In this case, the base station is triggered to control the UE A to stop continuing to perform communication in the first communication manner.

In addition, the base station may further determine, based on the measurement result reported by the user equipment UE A, whether to control the UE A to stop continuing to perform communication in the first communication manner. Specifically, after accessing the network by using the UE C, the UE A may periodically detect, for example, RSRP and/or reference signal received quality RSRQ, and report the measurement result to the base station. When determining, according to the measurement result, that corresponding PSRP and RSRQ satisfy a specific condition, that is, are greater than a specific threshold, the base station controls the UE A to stop continuing to perform communication in the first communication manner.

Figure 8:
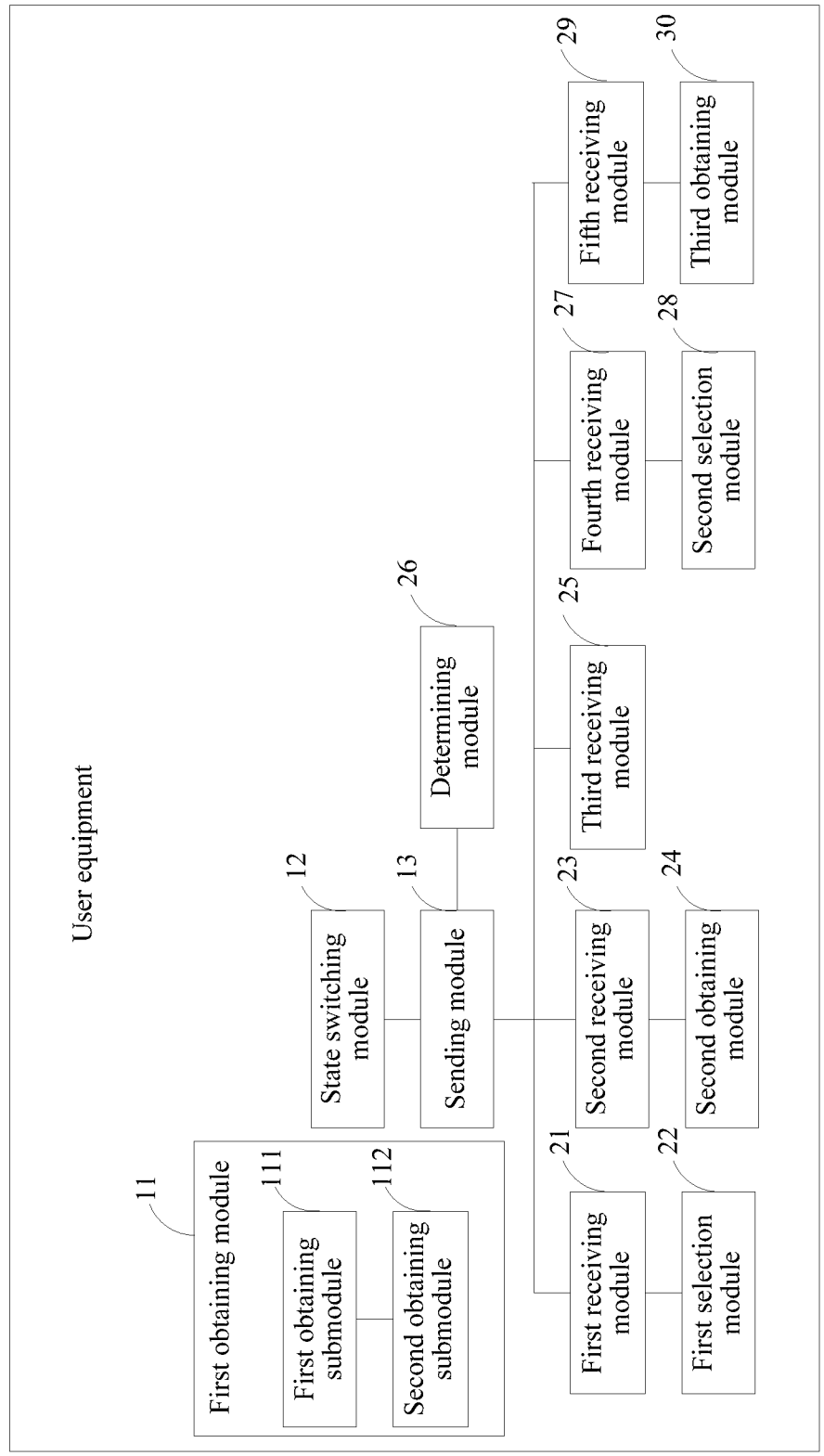
FIG. 8 is a schematic structural diagram of Embodiment 1 of user equipment according to an embodiment of the present invention.

FIG. 8 is a schematic structural diagram of Embodiment 1 of user equipment according to an embodiment of the present invention. As shown in FIG. 8, the user equipment is configured to: when needing to perform first communication, obtain, from a base station, a first communication resource required for the first communication. The user equipment includes a first obtaining module 11, or the user equipment includes a state switching module 12 and a sending module 13.

The first obtaining module 11 is configured to: when the user equipment is in an RRC idle state, obtain the first communication resource by receiving a system information block SIB broadcast by the base station.

The state switching module 12 is configured to: when the user equipment is in an RRC idle state, control the user equipment to enter an RRC connected state.

The sending module 13 is configured to send a first communication resource request to the base station, where the first communication resource request is used to request the base station to allocate the first communication resource.

The sending module 13 is further configured to: when the user equipment is in an RRC connected state, send a first communication resource request to the base station.

The user equipment is configured to obtain the first communication resource according to a use mode of the first communication resource. The use mode of the first communication resource includes a shared mode and an independent mode. The shared mode means that the first communication resource and a second communication resource can be shared, and the independent mode means that the first communication resource and the second communication resource are used independently. The use mode of the first communication resource is stipulated in a protocol, or configured by using an RRC message. The second communication resource is a corresponding communication resource used when second communication is performed.

Optionally, the first obtaining module 11 includes a first obtaining submodule 111 or a second obtaining submodule 112.

The first obtaining submodule 111 is configured to: if the use mode of the first communication resource is the shared mode, and the SIB broadcast by the base station includes a second communication resource pool used for the second communication and includes an indication message instructing the user equipment to perform the first communication by using the second communication resource pool, enable the user equipment to remain in the RRC idle state, and obtain the first communication resource used for the first communication from the second communication resource pool that is used for the second communication and that is included in the SIB broadcast by the base station.

The second obtaining submodule 112 is configured to: if the use mode of the first communication resource is the independent mode, and the SIB broadcast by the base station includes a first communication resource pool used for the first communication, enable the user equipment to remain in the RRC idle state, and obtain the first communication resource used for the first communication from the first communication resource pool that is used for the first communication and that is included in the SIB broadcast by the base station.

Optionally, the state switching module 12 is specifically configured to:

if the use mode of the first communication resource is the shared mode, and the SIB broadcast by the base station does not provide a second communication resource pool used for the second communication or a first communication resource pool used for the first communication, control the user equipment to enter the RRC connected state; or the state switching module 12 is specifically configured to:

if the use mode of the first communication resource is the independent mode, and the SIB broadcast by the base station does not provide a first communication resource pool used for the first communication, control the user equipment to enter the RRC connected state; or the state switching module 12 is specifically configured to:

if the use mode of the first communication resource is the independent mode, and the SIB broadcast by the base station includes a second communication resource pool used for the second communication and does not include an indication message instructing the user equipment to perform the first communication by using the second communication resource pool or includes an indication message used to indicate that the user equipment cannot perform the first communication by using the second communication resource pool, control the user equipment to enter the RRC connected state; or the state switching module 12 is specifically configured to:

if the SIB broadcast by the base station includes an indication message instructing the user equipment to enter the RRC connected state and send the first communication resource request to the base station to obtain the first communication resource, control the user equipment to enter the RRC connected state.

Optionally, the user equipment further includes a first receiving module 21 and a first selection module 22.

The first receiving module 21 is configured to receive an indication message indicating that the base station instructs, by using first RRC signaling or a first Media Access Control control element MAC CE, the user equipment to perform the first communication by using the second communication resource pool used for the second communication.

The first selection module 22 is configured to select the first communication resource from the second communication resource pool.

Optionally, the user equipment further includes a second receiving module 23 and a second obtaining module 24.

The second receiving module 23 is configured to receive an indication message indicating that the base station instructs, by using second RRC signaling or a second MAC CE, the user equipment to reuse a sidelink-radio network temporary identifier SL-RNTI to obtain the first communication resource, where the SL-RNTI is an RNTI used to schedule the communication resource used for the second communication.

The second obtaining module 24 is configured to obtain, according to the SL-RNTI, the second communication resource allocated by the base station, and use the second communication resource as the first communication resource.

Optionally, the user equipment further includes a third receiving module 25.

The third receiving module 25 is configured to receive a resource rejection message that is sent by the base station to the user equipment by using third RRC signaling or a third Media Access Control control element MAC CE.

The resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication.

Optionally, the user equipment further includes a determining module 26.

The determining module 26 is configured to: if the user equipment receives no information about resource allocation of the base station, determine that the first communication cannot be performed.

Optionally, the user equipment further includes a fourth receiving module 27 and a second selection module 28.

The fourth receiving module 27 is configured to receive the first communication resource pool that is sent by the base station by using fourth RRC signaling or a fourth MAC CE.

The second selection module 28 is configured to select the first communication resource from the first communication resource pool.

Optionally, the user equipment further includes a fifth receiving module 29 and a third obtaining module 30.

The fifth receiving module 29 is configured to receive a new radio network temporary identifier New-RNTI that is sent by the base station by using fifth RRC signaling or a fifth MAC CE, where the New-RNTI is an RNTI used to schedule the communication resource used for the first communication.

The third obtaining module 30 is configured to obtain the first communication resource according to the New-RNTI.

The first communication is unicast D2D communication or relay communication, and the second communication is multicast D2D communication.

The user equipment is remote user equipment or relay user equipment.

The optional implementations in the embodiment shown in FIG. 8 may be used to perform the technical solutions of the user equipment in FIG. 2, FIG. 2a to FIG. 2g, and FIG. 3a to FIG. 3d. Implementation principles and technical effects thereof are similar, and details are not described herein again.

Figure 9:
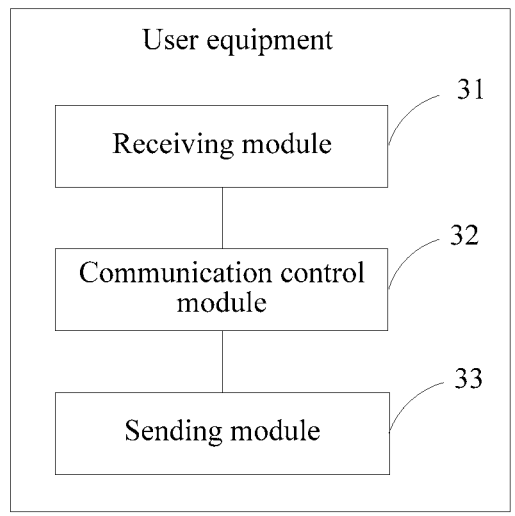
FIG. 9 is a schematic structural diagram of Embodiment 2 of user equipment according to an embodiment of the present invention.

FIG. 9 is a schematic structural diagram of Embodiment 2 of user equipment according to an embodiment of the present invention. The user equipment is configured to perform first communication. As shown in FIG. 9, the user equipment includes a receiving module 31 and a communication control module 32.

The receiving module 31 is configured to receive information that is sent by a base station by using RRC signaling or a MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool.

The communication control module 32 is configured to: according to the information, stop the first communication or stop using the resource used for the first communication and/or stop using the configured New-RNTI used to schedule the communication resource used for the first communication and/or stop using the configured SL-RNTI used to schedule the communication resource used for the second communication.

Optionally, the receiving module 31 is further configured to receive a grant message that is sent by the base station by using a PDCCH or an ePDCCH and that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication.

The communication control module 32 is further configured to: obtain, according to the corresponding SL-RNTI or New-RNTI, the indication message instructing to stop the first communication, and stop performing the first communication.

The MAC CE includes a MAC PDU subheader of a particular logical channel index identifier; or the MAC CE includes an identifier of the user equipment whose first communication is stopped and/or indication information instructing the user equipment to stop the first communication.

The first communication is unicast D2D communication or relay communication, and the second communication is multicast D2D communication.

The user equipment is remote user equipment or relay user equipment.

Optionally, the user equipment further includes a sending module 33.

The sending module 33 is configured to: report a measurement event to the base station, where the measurement event indicates that link quality and/or signal strength of receiving by the user equipment from the base station satisfy/satisfies a specific condition; and/or report a measurement result to the base station, where the measurement result includes RSRP and/or RSRQ.

The user equipment provided in this embodiment is configured to perform the technical solutions of the user equipment in the embodiment shown in FIG. 6 or FIG. 7. Implementation principles and technical effects thereof are similar, and details are not described again.

Figure 10:
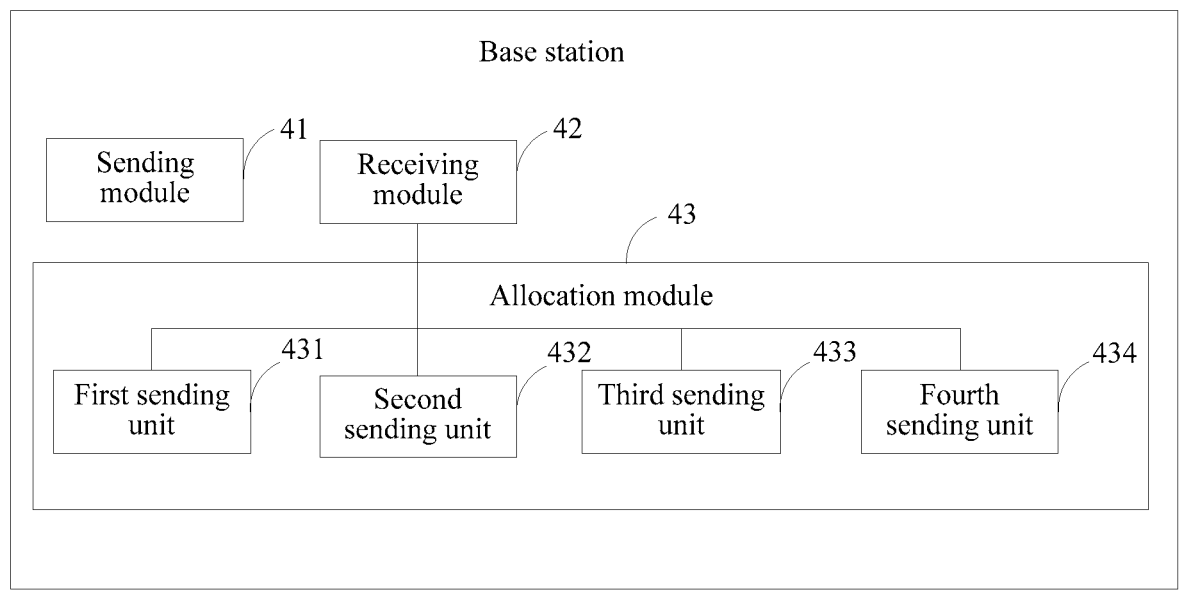
FIG. 10 is a schematic structural diagram of Embodiment 1 of a base station according to an embodiment of the present invention.

FIG. 10 is a schematic structural diagram of Embodiment 1 of a base station according to an embodiment of the present invention. The base station is configured to allocate, to user equipment needing to perform first communication, a first communication resource required for the first communication. As shown in FIG. 10, the base station includes a sending module 41, or a receiving module 42 and an allocation module 43.

The sending module 41 is configured to broadcast a SIB carrying the first communication resource, so that the user equipment in an RRC idle state obtains the first communication resource according to the SIB.

The receiving module 42 is configured to receive a first communication resource request sent by the user equipment in an RRC connected state.

The allocation module 43 is configured to allocate the first communication resource to the user equipment in the RRC connected state according to the first communication resource request.

The base station allocates the first communication resource required for the first communication to the user equipment according to a use mode of the first communication resource. The use mode of the first communication resource includes a shared mode and an independent mode. The shared mode means that the first communication resource and a second communication resource can be shared, and the independent mode means that the first communication resource and the second communication resource are used independently.

The use mode of the first communication resource is stipulated in a protocol, or configured by using an RRC message. The second communication resource is a corresponding communication resource used when second communication is performed.

Optionally, the sending module 41 is specifically configured to: if the use mode of the first communication resource is the shared mode, broadcast a first SIB, where the first SIB includes a second communication resource pool used for the second communication and includes an indication message instructing the user equipment to perform the first communication by using the second communication resource pool, and the first SIB enables the user equipment in the RRC idle state to remain in the RRC idle state, and select the first communication resource from the second communication resource pool.

Optionally, the sending module 41 is specifically configured to: if the use mode of the first communication resource is the independent mode, broadcast a second SIB, where the second SIB includes a first communication resource pool used for the first communication, and the second SIB enables the user equipment in the RRC idle state to remain in the RRC idle state, and select the first communication resource from the first communication resource pool.

Optionally, the sending module 41 is further configured to: if the use mode of the first communication resource is the shared mode, broadcast a third SIB, where the third SIB does not provide a second communication resource pool used for the second communication or a first communication resource pool used for the first communication, and the third SIB enables the user equipment in the RRC idle state to enter the RRC connected state, and send the first communication resource request to the base station.

Optionally, the sending module 41 is further configured to:

if the use mode of the first communication resource is the independent mode, broadcast a fourth SIB, where the fourth SIB does not provide a first communication resource pool used for the first communication, and the fourth SIB enables the user equipment in the RRC idle state to enter the RRC connected state, and send the first communication resource request to the base station.

Optionally, the sending module 41 is further configured to:

if the use mode of the first communication resource is the independent mode, broadcast a fifth SIB, where the fifth SIB includes a second communication resource pool used for the second communication and does not include an indication message instructing the user equipment to perform the first communication by using the second communication resource pool or includes an indication message used to indicate that the user equipment cannot perform the first communication by using the second communication resource pool, and the fifth SIB enables the user equipment in the RRC idle state to enter the RRC connected state, and send the first communication resource request to the base station.

Optionally, the sending module 41 is further configured to:

broadcast a sixth SIB, where the sixth SIB includes an indication message instructing the user equipment to enter the RRC connected state and send the first communication resource request to the base station to obtain the first communication resource, and the sixth SIB enables the user equipment in the RRC idle state to enter the RRC connected state, and send the first communication resource request to the base station.

Optionally, the allocation module 43 includes a first sending unit 431 or a second sending unit 432.

The first sending unit 431 is configured to send, to the user equipment by using first RRC signaling or a first Media Access Control control element MAC CE, an indication message instructing the user equipment to perform the first communication by using the second communication resource pool used for the second communication, so that the user equipment selects the first communication resource from the second communication resource pool.

The second sending unit 432 is configured to send, to the user equipment by using second RRC signaling or a second MAC CE, an indication message instructing the user equipment to reuse an SL-RNTI to obtain the first communication resource, where the SL-RNTI is an RNTI used to schedule the communication resource used for the second communication, so that the user equipment obtains, according to the SL-RNTI, the second communication resource allocated by the base station, and uses the second communication resource as the first communication resource.

Optionally, the sending module 41 is further configured to:

send a resource rejection message to the user equipment by using third RRC signaling or a third MAC CE, where the resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication.

Optionally, the sending module 41 is controlled to skip sending information about resource allocation, so that the user equipment determines that the first communication cannot be performed.

Optionally, the allocation module 43 includes a third sending unit 433 or a fourth sending unit 434.

The third sending unit 433 is configured to send the first communication resource pool to the user equipment by using fourth RRC signaling or a fourth MAC CE, so that the user equipment selects the first communication resource from the first communication resource pool.

The fourth sending unit 434 is configured to send a New-RNTI to the user equipment by using fifth RRC signaling or a fifth MAC CE, where the New-RNTI is an RNTI used to schedule the communication resource used for the first communication, so that the user equipment obtains the first communication resource according to the New-RNTI.

The first communication includes unicast D2D communication or relay communication, and the second communication includes multicast D2D communication.

The user equipment is remote user equipment or relay user equipment.

The base station provided in this embodiment may be configured to perform the technical solutions in manner 1 to manner 7 and manner 1 to manner 4 that are performed by the base station in the foregoing embodiments. Implementation principles and technical effects thereof are similar, and details are not described again.

Figure 11:
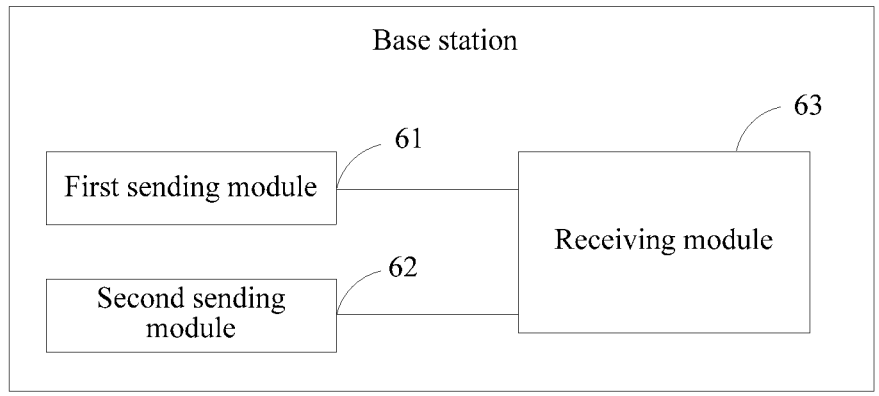
FIG. 11 is a schematic structural diagram of Embodiment 2 of a base station according to an embodiment of the present invention.

FIG. 11 is a schematic structural diagram of Embodiment 2 of a base station according to an embodiment of the present invention. The base station is configured to control first communication. As shown in FIG. 11, the base station includes a first sending module 61 or a second sending module 62.

The first sending module 61 is configured to send information to user equipment by using RRC signaling or a MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool.

The second sending module 62 is configured to send, to user equipment by using a PDCCH or an ePDCCH, a grant message that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication, so that the user equipment stops performing the first communication when obtaining, according to the corresponding SL-RNTI or New-RNTI, the indication message instructing to stop the first communication.

The MAC CE includes a MAC PDU subheader of a particular logical channel index identifier; or the MAC CE includes an identifier of the user equipment whose first communication is stopped and/or indication information instructing the user equipment to stop the first communication.

The first communication is unicast D2D communication or relay communication, and the second communication is multicast D2D communication.

The user equipment is remote user equipment or relay user equipment.

Optionally, the base station further includes a receiving module 63.

The receiving module 63 is configured to: receive a measurement event reported by the user equipment, where the measurement event indicates that link quality and/or signal strength of receiving by the user equipment from the base station satisfy/satisfies a specific condition; and/or receive a measurement result reported by the user equipment, and determine whether the measurement result satisfies a specific condition, where the measurement result includes RSRP and/or RSRQ.

The base station provided in this embodiment may be configured to perform the technical solutions in manner a and manner b that are performed by the base station in the foregoing embodiments. Implementation principles and technical effects thereof are similar, and details are not described again.

Figure 12:
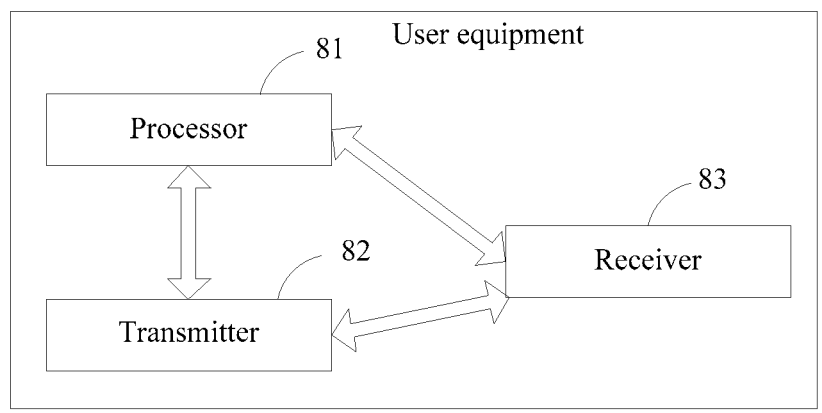
FIG. 12 is a schematic structural diagram of Embodiment 1 of another user equipment according to an embodiment of the present invention.

FIG. 12 is a schematic structural diagram of Embodiment 1 of another user equipment according to an embodiment of the present invention. The user equipment is configured to: when needing to perform first communication, obtain, from a base station, a first communication resource required for the first communication. As shown in FIG. 12, the user equipment includes a processor 81 and a transmitter 82.

The processor 81 is configured to: when the user equipment is in an RRC idle state, obtain the first communication resource by receiving a system information block SIB broadcast by the base station.

The processor is further configured to: when the user equipment is in an RRC idle state, control the user equipment to enter an RRC connected state.

The transmitter 82 is configured to send a first communication resource request to the base station, where the first communication resource request is used to request the base station to allocate the first communication resource.

The transmitter 82 is further configured to: when the user equipment is in an RRC connected state, send a first communication resource request to the base station.

The user equipment is configured to obtain the first communication resource according to a use mode of the first communication resource, where the use mode of the first communication resource includes a shared mode and an independent mode, where the shared mode means that the first communication resource and a second communication resource can be shared; or the independent mode means that the first communication resource and the second communication resource are used independently;

the use mode of the first communication resource is stipulated in a protocol, or configured by using an RRC message; and the second communication resource is a corresponding communication resource used when second communication is performed.

Optionally, the processor 81 is further configured to: if the use mode of the first communication resource is the shared mode, and the SIB broadcast by the base station includes a second communication resource pool used for the second communication and includes an indication message instructing the user equipment to perform the first communication by using the second communication resource pool, enable the user equipment to remain in the RRC idle state, and obtain the first communication resource used for the first communication from the second communication resource pool that is used for the second communication and that is included in the SIB broadcast by the base station.

Optionally, the processor 81 is further configured to: if the use mode of the first communication resource is the independent mode, and the SIB broadcast by the base station includes a first communication resource pool used for the first communication, enable the user equipment to remain in the RRC idle state, and obtain the first communication resource used for the first communication from the first communication resource pool that is used for the first communication and that is included in the SIB broadcast by the base station.

Optionally, the processor 81 is further configured to:

if the use mode of the first communication resource is the shared mode, and the SIB broadcast by the base station does not provide a second communication resource pool used for the second communication or a first communication resource pool used for the first communication, control the user equipment to enter the RRC connected state.

Optionally, the processor 81 is further configured to:

if the use mode of the first communication resource is the independent mode, and the SIB broadcast by the base station does not provide a first communication resource pool used for the first communication, control the user equipment to enter the RRC connected state.

Optionally, the processor 81 is further configured to:

if the use mode of the first communication resource is the independent mode, and the SIB broadcast by the base station includes a second communication resource pool used for the second communication and does not include an indication message instructing the user equipment to perform the first communication by using the second communication resource pool or includes an indication message used to indicate that the user equipment cannot perform the first communication by using the second communication resource pool, control the user equipment to enter the RRC connected state.

Optionally, the processor 81 is further configured to:

if the SIB broadcast by the base station includes an indication message instructing the user equipment to enter the RRC connected state and send the first communication resource request to the base station to obtain the first communication resource, control the user equipment to enter the RRC connected state.

Optionally, the user equipment further includes:

a receiver 83, configured to receive an indication message indicating that the base station instructs, by using first RRC signaling or a first Media Access Control control element MAC CE, the user equipment to perform the first communication by using the second communication resource pool used for the second communication; and the processor 81 is further configured to select the first communication resource from the second communication resource pool.

Optionally, the receiver 83 is further configured to receive an indication message indicating that the base station instructs, by using second RRC signaling or a second MAC CE, the user equipment to reuse a sidelink-radio network temporary identifier SL-RNTI to obtain the first communication resource, where the SL-RNTI is an RNTI used to schedule the communication resource used for the second communication.

The processor 81 is further configured to: obtain, according to the SL-RNTI, the second communication resource allocated by the base station, and use the second communication resource as the first communication resource.

Optionally, the receiver 83 is further configured to receive a resource rejection message that is sent by the base station to the user equipment by using third RRC signaling or a third Media Access Control control element MAC CE.

The resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication.

The processor 81 is further configured to: if the receiver receives no information about resource allocation of the base station, determine that the first communication cannot be performed.

Optionally, the receiver 83 is further configured to receive the first communication resource pool that is sent by the base station by using fourth RRC signaling or a fourth MAC CE.

The processor 81 is further configured to select the first communication resource from the first communication resource pool.

Optionally, the receiver 83 is further configured to receive a new radio network temporary identifier New-RNTI that is sent by the base station by using fifth RRC signaling or a fifth MAC CE, where the New-RNTI is an RNTI used to schedule the communication resource used for the first communication.

The processor 81 is further configured to obtain the first communication resource according to the New-RNTI.

The first communication is unicast D2D communication or relay communication, and the second communication is multicast D2D communication.

The user equipment is remote user equipment or relay user equipment.

The user equipment in this embodiment shown in FIG. 12 may be configured to perform the technical solutions of the user equipment in FIG. 2, FIG. 2*a* to FIG. 2*g*, FIG. 3*a* to FIG. 3*d*, and FIG. 5. Implementation principles and technical effects thereof are similar, and details are not described herein again.

Figure 13:
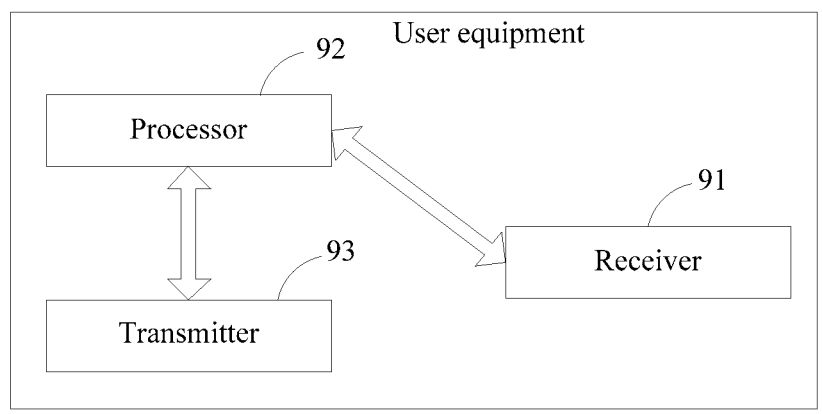
FIG. 13 is a schematic structural diagram of Embodiment 2 of another user equipment according to an embodiment of the present invention.

FIG. 13 is a schematic structural diagram of Embodiment 2 of another user equipment according to an embodiment of the present invention. The user equipment is configured to perform first communication. As shown in FIG. 13, the user equipment includes a receiver 91 and a processor 92.

The receiver 91 is configured to receive information that is sent by a base station by using RRC signaling or a MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool; and the processor 92 is configured to: according to the information, stop the first communication or stop using the resource used for the first communication and/or stop using the configured New-RNTI used to schedule the communication resource used for the first communication and/or stop using the configured SL-RNTI used to schedule the communication resource used for the second communication; or the receiver 91 is configured to receive a grant message that is sent by a base station by using a PDCCH or an ePDCCH and that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication; and the processor 92 is configured to stop performing the first communication when obtaining, according to the corresponding SL-RNTI or New-RNTI, the indication message instructing to stop the first communication.

The MAC CE includes a MAC PDU subheader of a particular logical channel index identifier; or the MAC CE includes an identifier of the user equipment whose first communication is stopped and/or indication information instructing the user equipment to stop the first communication.

The first communication is unicast D2D communication or relay communication, and the second communication is multicast D2D communication.

The user equipment is remote user equipment or relay user equipment.

Optionally, the user equipment further includes a transmitter 93.

The transmitter 93 is configured to: report a measurement event to the base station, where the measurement event indicates that link quality and/or signal strength of receiving by the user equipment from the base station satisfy/satisfies a specific condition; and/or report a measurement result to the base station, where the measurement result includes RSRP and/or RSRQ.

The user equipment provided in this embodiment is configured to perform the technical solutions of the user equipment in the embodiment shown in FIG. 6 or FIG. 7. Implementation principles and technical effects thereof are similar, and details are not described again.

Figure 14:
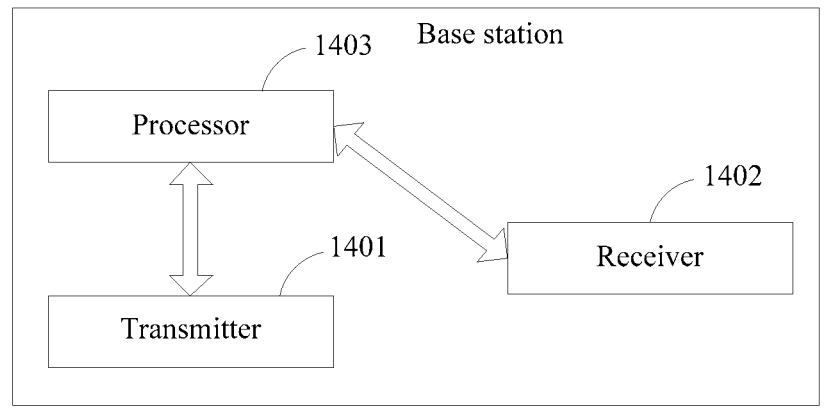
FIG. 14 is a schematic structural diagram of Embodiment 1 of another base station according to an embodiment of the present invention.

FIG. 14 is a schematic structural diagram of Embodiment 1 of another base station according to an embodiment of the present invention. The base station is configured to allocate, to user equipment needing to perform first communication, a first communication resource required for the first communication. As shown in FIG. 14, the base station includes a transmitter 1401, or a receiver 1402 and a processor 1403.

The transmitter 1401 is configured to broadcast a SIB carrying the first communication resource, so that the user equipment in an RRC idle state obtains the first communication resource according to the SIB.

The receiver 1402 is configured to receive a first communication resource request sent by the user equipment in an RRC connected state.

The processor 1403 is configured to allocate the first communication resource to the user equipment in the RRC connected state according to the first communication resource request.

The base station allocates the first communication resource required for the first communication to the user equipment according to a use mode of the first communication resource, where the use mode of the first communication resource includes a shared mode and an independent mode, where the shared mode means that the first communication resource and a second communication resource can be shared; or the independent mode means that the first communication resource and the second communication resource are used independently;

the use mode of the first communication resource is stipulated in a protocol, or configured by using an RRC message; and the second communication resource is a corresponding communication resource used when second communication is performed.

Optionally, the transmitter 1401 is further configured to: if the use mode of the first communication resource is the shared mode, broadcast a first SIB, where the first SIB includes a second communication resource pool used for the second communication and includes an indication message instructing the user equipment to perform the first communication by using the second communication resource pool, and the first SIB enables the user equipment in the RRC idle state to remain in the RRC idle state, and select the first communication resource from the second communication resource pool.

Optionally, the transmitter 1401 is further configured to: if the use mode of the first communication resource is the independent mode, broadcast a second SIB, where the second SIB includes a first communication resource pool used for the first communication, and the second SIB enables the user equipment in the RRC idle state to remain in the RRC idle state, and select the first communication resource from the first communication resource pool.

Optionally, the transmitter 1401 is further configured to: if the use mode of the first communication resource is the shared mode, broadcast a third SIB, where the third SIB does not provide a second communication resource pool used for the second communication or a first communication resource pool used for the first communication, and the third SIB enables the user equipment in the RRC idle state to enter the RRC connected state, and send the first communication resource request to the base station.

Optionally, the transmitter 1401 is further configured to: if the use mode of the first communication resource is the independent mode, broadcast a fourth SIB, where the fourth SIB does not provide a first communication resource pool used for the first communication, and the fourth SIB enables the user equipment in the RRC idle state to enter the RRC connected state, and send the first communication resource request to the base station.

Optionally, the transmitter 1401 is further configured to: if the use mode of the first communication resource is the independent mode, broadcast a fifth SIB, where the fifth SIB includes a second communication resource pool used for the second communication and does not include an indication message instructing the user equipment to perform the first communication by using the second communication resource pool or includes an indication message used to indicate that the user equipment cannot perform the first communication by using the second communication resource pool, and the fifth SIB enables the user equipment in the RRC idle state to enter the RRC connected state, and send the first communication resource request to the base station.

Optionally, the transmitter 1401 is further configured to broadcast a sixth SIB, where the sixth SIB includes an indication message instructing the user equipment to enter the RRC connected state and send the first communication resource request to the base station to obtain the first communication resource, and the sixth SIB enables the user equipment in the RRC idle state to enter the RRC connected state, and send the first communication resource request to the base station.

Optionally, the transmitter 1401 is further configured to: send, to the user equipment by using first RRC signaling or a first Media Access Control control element MAC CE, an indication message instructing the user equipment to perform the first communication by using the second communication resource pool used for the second communication, so that the user equipment selects the first communication resource from the second communication resource pool.

Optionally, the transmitter 1401 is further configured to send, to the user equipment by using second RRC signaling or a second MAC CE, an indication message instructing the user equipment to reuse an SL-RNTI to obtain the first communication resource, where the SL-RNTI is an RNTI used to schedule the communication resource used for the second communication, so that the user equipment obtains, according to the SL-RNTI, the second communication resource allocated by the base station, and uses the second communication resource as the first communication resource.

Optionally, the transmitter 1401 is further configured to send a resource rejection message to the user equipment by using third RRC signaling or a third MAC CE, where the resource rejection message includes a resource rejection indication, and the resource rejection indication is instructing to forbid the user equipment to use the second communication resource pool, and/or instruct to forbid the user equipment to use an allocated SL-RNTI used to schedule the communication resource used for the second communication.

Optionally, the transmitter 1401 is further configured to be controlled by the processor to skip sending information about resource allocation, so that the user equipment determines that the first communication cannot be performed.

Optionally, the transmitter 1401 is further configured to send the first communication resource pool to the user equipment by using fourth RRC signaling or a fourth MAC CE, so that the user equipment selects the first communication resource from the first communication resource pool.

Optionally, the transmitter 1401 is further configured to send a New-RNTI to the user equipment by using fifth RRC signaling or a fifth MAC CE, where the New-RNTI is an RNTI used to schedule the communication resource used for the first communication, so that the user equipment obtains the first communication resource according to the New-RNTI.

The first communication includes unicast D2D communication or relay communication, and the second communication includes multicast D2D communication.

The user equipment is remote user equipment or relay user equipment.

The base station provided in this embodiment may be configured to perform the technical solutions in manner 1 to manner 7 and manner 1 to manner 4 that are performed by the base station in the foregoing embodiments. Implementation principles and technical effects thereof are similar, and details are not described again.

Figure 15:
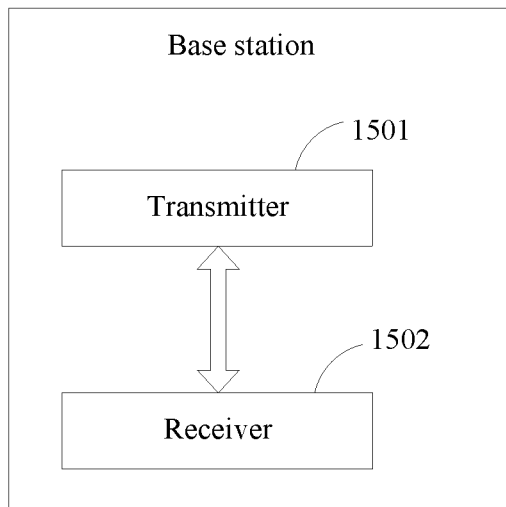
FIG. 15 is a schematic structural diagram of Embodiment 2 of another base station according to an embodiment of the present invention.

FIG. 15 is a schematic structural diagram of Embodiment 2 of another base station according to an embodiment of the present invention. The base station is configured to control first communication. As shown in FIG. 15, the base station includes a transmitter 1501.

The transmitter 1501 is configured to send information to user equipment by using RRC signaling or a MAC CE, where the information is instructing the user equipment to stop the first communication or stop using a resource used for the first communication and/or stop using a configured New-RNTI used to schedule a communication resource used for the first communication and/or stop using a configured SL-RNTI used to schedule a communication resource used for second communication, and the resource used for the first communication includes a first communication resource pool and a second communication resource pool.

Optionally, the transmitter 1501 is further configured to send, to user equipment by using a PDCCH or an ePDCCH, a grant message that is scrambled by using an SL-RNTI or a New-RNTI, where the grant message includes an indication message instructing to stop the first communication, the SL-RNTI is an RNTI used to schedule a communication resource used for second communication, and the New-RNTI is an RNTI used to schedule a communication resource used for the first communication, so that the user equipment stops performing the first communication when obtaining, according to the corresponding SL-RNTI or New-RNTI, the indication message instructing to stop the first communication.

The MAC CE includes a MAC PDU subheader of a particular logical channel index identifier; or the MAC CE includes an identifier of the user equipment whose first communication is stopped and/or indication information instructing the user equipment to stop the first communication.

The first communication is unicast D2D communication or relay communication, and the second communication is multicast D2D communication.

The user equipment is remote user equipment or relay user equipment.

Optionally, the base station further includes:

a receiver 1502, configured to: receive a measurement event reported by the user equipment, where the measurement event indicates that link quality and/or signal strength of receiving by the user equipment from the base station satisfy/satisfies a specific condition; and/or receive a measurement result reported by the user equipment, and determine whether the measurement result satisfies a specific condition, where the measurement result includes RSRP and/or RSRQ.

The base station provided in this embodiment may be configured to perform the technical solutions in manner a and manner b that are performed by the base station in the foregoing embodiments. Implementation principles and technical effects thereof are similar, and details are not described again.

It should be understood that, in the foregoing user equipment and base station embodiments, the processor may be a central processing unit (English: Central Processing Unit, CPU for short), or may be another general-purpose processor, a digital signal processor (English: Digital Signal Processor, DSP for short), an application-specific integrated circuit (English: Application Specific Integrated Circuit, ASIC for short), or the like. The general purpose processor may be a microprocessor, or the processor may be any conventional processor, or the like. The steps of the method disclosed with reference to the embodiments of the present invention may be directly performed by a hardware processor, or may be performed by using a combination of hardware in the processor and a software module.

Persons of ordinary skill in the art may understand that all or some of the steps of the method embodiments may be implemented by a program instructing relevant hardware. The program may be stored in a computer-readable storage medium. When the program is executed, the steps of the methods in the embodiments are performed. The storage medium includes: a read-only memory (English: read-only memory, ROM for short), a RAM, a flash memory, a hard disk, a solid state disk, a magnetic tape (English: magnetic tape), a floppy disk (English: floppy disk), an optical disc (English: optical disc), and any combination thereof.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for controlling communication, the method comprising:

obtaining, at user equipment, from a base station to perform a first communication, a first communication resource for performing the first communication, wherein obtaining, at the user equipment, from a base station, the first communication resource for performing the first communication comprises:

if the user equipment is in an Radio Resource Control (RRC) idle state:

obtaining the first communication resource by receiving a system information block (SIB) broadcast by the base station; and entering an RRC connected state; and if the user equipment is in an RRC connected state, sending a first communication resource request to the base station, wherein the first communication resource request is configured to request the base station to allocate the first communication resource and wherein the SIB comprises information indicating a use mode of the first communication resource for the UE to request the first communication resource from the base station, the use mode being at least one of multiple use modes including a shared mode, and the shared mode indicating the first communication resource can be a resource used for a second communication.

2. The method according to claim 1, wherein obtaining, at the user equipment, from the base station to perform first communication, the first communication resource for the first communication comprises:

obtaining, by the user equipment, the first communication resource according to the use mode of the first communication resource, wherein the use mode is at least one of the shared mode and an independent mode, wherein the independent mode indicates that the first communication resource and a second communication resource are used independently;

the use mode of the first communication resource is specified in a protocol, or configured by using an RRC message; and the second communication resource is a communication resource used when second communication is performed.

3. The method according to claim 1, wherein obtaining, if the user equipment is in the RRC idle state, the first communication resource by receiving the SIB broadcast by the base station comprises:

if a use mode of the first communication resource is the shared mode, and the SIB broadcast by the base station comprises a second communication resource pool used for the second communication and comprises an indication message instructing the user equipment to perform the first communication by using the second communication resource pool:
  staying, by the user equipment, in the idle state; and
  obtaining, by the user equipment, the first communication resource for the first communication from the second communication resource pool for the second communication, the second communication resource pool being in the SIB broadcast by the base station; and
if the use mode of the first communication resource is an independent mode, and the SIB broadcast by the base station comprises a first communication resource pool used for the first communication,
  staying, by the user equipment, in the idle state; and
  obtaining the first communication resource used for the first communication from the first communication resource pool used for the first communication, the first communication resource pool being in the SIB broadcast by the base station.

4. The method according to claim 1, wherein entering the RRC connected state if the user equipment is in the RRC idle state comprises:
  if the use mode of the first communication resource is the shared mode, and the SIB broadcast by the base station does not provide a second communication resource pool used for the second communication or a first communication resource pool used for the first communication, entering, by the user equipment, the RRC connected state, and sending the first communication resource request to the base station;
  if the use mode of the first communication resource is an independent mode, and the SIB broadcast by the base station does not provide a first communication resource pool used for the first communication, entering, by the user equipment, the RRC connected state, and sending the first communication resource request to the base station;
  if the use mode of the first communication resource is the independent mode, and the SIB broadcast by the base station comprises a second communication resource pool used for the second communication and does not comprise an indication message instructing the user equipment to perform the first communication by using the second communication resource pool or comprises an indication message used to indicate that the user equipment cannot perform the first communication by using the second communication resource pool, entering, by the user equipment, the RRC connected state, and sending the first communication resource request to the base station; and
  if the SIB broadcast by the base station comprises an indication message instructing the user equipment to enter the RRC connected state and send the first communication resource request to the base station to obtain the first communication resource, entering, by the user equipment, the RRC connected state, and sending the first communication resource request to the base station.

5. The method according to claim 1, wherein after the sending, by the user equipment, the first communication resource request to the base station, the method further comprises:
  receiving, by the user equipment, an indication message indicating that the base station instructs, through first RRC signaling or a first Media Access Control control element (MAC CE), the user equipment to perform the first communication by using a second communication resource pool used for a second communication; and
  selecting, by the user equipment, the first communication resource from the second communication resource pool; or
  receiving, by the user equipment, an indication message indicating that the base station instructs, through second RRC signaling or a second MAC CE, the user equipment to reuse a sidelink-radio network temporary identifier SL-RNTI to obtain the first communication resource, wherein the SL-RNTI is an RNTI for scheduling a second communication resource for the second communication; and
  obtaining, by the user equipment according to the SL-RNTI, the second communication resource allocated by the base station, and using the second communication resource as the first communication resource.

6. A method for controlling communication, wherein a base station allocates, to user equipment needing to perform first communication, a first communication resource for performing the first communication, comprising:
  broadcasting, by the base station, a system information block (SIB) message carrying information regarding the first communication resource to enable the user equipment in an RRC idle state to obtain the first communication resource according to the SIB message, wherein the SIB comprises information indicating a use mode of the first communication resource for the UE to request the first communication resource from the base station, the use mode being at least one of multiple use modes including a shared mode, and the shared mode indicating the first communication resource can be a resource used for a second communication;
  receiving, by the base station, a first communication resource request sent by the user equipment in an RRC connected state; and
  allocating, by the base station, the first communication resource to the user equipment in the RRC connected state according to the first communication resource request.

7. The method according to claim 6, wherein that a base station allocates, to user equipment needing to perform first communication, a first communication resource for the first communication comprises:
  allocating, by the base station, the first communication resource for the first communication to the user equipment according to the use mode of the first communication resource, wherein the use mode being at least one of the shared mode and an independent mode, wherein
  the independent mode indicates that the first communication resource and a second communication resource are used independently;
  the use mode of the first communication resource is specified in a protocol, or configured by using an RRC message; and
  the second communication resource is a corresponding communication resource used when second communication is performed.

8. User equipment, wherein the user equipment is configured to: for performing a first communication, obtain, from a base station, a first communication resource for the first communication, and the user equipment comprises:
  a processor, configured to:
  when the user equipment is in an RRC idle state, obtain the first communication resource by receiving a system information block (SIB) broadcast by the base station, wherein the SIB comprises information indicating a use mode of the first communication resource for the UE to request the first communication resource from the base station, the use mode being at least one of multiple use modes including a shared mode, and the shared mode indicating the first communication resource can be a resource used for a second communication; and when the user equipment is in an RRC idle state, control the user equipment to enter an RRC connected state; and the user equipment further comprises a transmitter, configured to:

send a first communication resource request to the base station, wherein the first communication resource request is for requesting the base station to allocate the first communication resource; and when the user equipment is in an RRC connected state, send a first communication resource request to the base station.

9. The user equipment according to claim 8 wherein the user equipment is configured to obtain the first communication resource according to the use mode of the first communication resource, wherein the use mode being at least one of the shared mode and an independent mode, wherein the independent mode indicates that the first communication resource and a second communication resource are used independently;

the use mode of the first communication resource is specified in a protocol, or configured by using an RRC message; and the second communication resource is a communication resource used when second communication is performed.

10. The user equipment according to claim 8, wherein the processor is further configured to:

if a use mode of the first communication resource is the shared mode, and the SIB broadcast by the base station comprises a second communication resource pool used for the second communication and comprises an indication message instructing the user equipment to perform the first communication by using the second communication resource pool:

enable the user equipment to stay in the RRC idle state, and obtain the first communication resource for the first communication from the second communication resource pool for the second communication, the second communication resource pool being included in the SIB broadcast by the base station; and if the use mode of the first communication resource is an independent mode, and the SIB broadcast by the base station comprises a first communication resource pool used for the first communication:

enable the user equipment to remain in the RRC idle state, and obtain the first communication resource used for the first communication from the first communication resource pool for the first communication, the first communication resource pool being included in the SIB broadcast by the base station.

11. A base station, wherein the base station is configured to allocate, to user equipment needing to perform first communication, a first communication resource for the first communication, and the base station comprises:

a transmitter, configured to broadcast a system information block (SIB) carrying information regarding the first communication resource to enable the user equipment in an RRC idle state to obtain the first communication resource according to the SIB, wherein the SIB comprises information indicating a use mode of the first communication resource for the UE to request the first communication resource from the base station, the use mode being at least one of multiple use modes including a shared mode, and the shared mode indicating the first communication resource can be a resource used for a second communication;

a receiver, configured to receive a first communication resource request sent by the user equipment in an RRC connected state; and a processor, configured to allocate the first communication resource to the user equipment in the RRC connected state according to the first communication resource request.

12. The base station according to claim 11, wherein the base station allocates the first communication resource for the first communication to the user equipment according to the use mode of the first communication resource, wherein the use mode being at least one of the shared mode and an independent mode, wherein the independent mode indicates that the first communication resource and a second communication resource are used independently;

the use mode of the first communication resource is specified in a protocol, or configured by using an RRC message; and the second communication resource is a corresponding communication resource used when second communication is performed.

13. The base station according to claim 11, wherein the transmitter is further configured to:

if the use mode of the first communication resource is a shared mode, broadcast a first SIB, wherein the first SIB comprises a second communication resource pool used for the second communication and comprises an indication message instructing the user equipment to perform the first communication by using the second communication resource pool, and the first SIB enables the user equipment in the RRC idle state to remain in the RRC idle state, and select the first communication resource from the second communication resource pool; and if the use mode of the first communication resource is an independent mode, broadcast a second SIB, wherein the second SIB comprises a first communication resource pool used for the first communication, and the second SIB enables the user equipment in the RRC idle state to remain in the RRC idle state, and select the first communication resource from the first communication resource pool.

* * * * *